(12) United States Patent
Kawamura et al.

(10) Patent No.: US 10,764,467 B2
(45) Date of Patent: Sep. 1, 2020

(54) IMAGE FORMING APPARATUS THAT PERFORMS AN ACCOMPLISHMENT DETERMINATION PROCESS AND NON-TRANSITORY RECORDING MEDIUM STORING COMPUTER READABLE PROGRAM

(71) Applicant: KONICA MINOLTA, INC., Chiyoda-ku, Tokyo (JP)

(72) Inventors: Yuji Kawamura, Toyokawa (JP); Yoichi Kurumasa, Toyokawa (JP); Takatsugu Kuno, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/549,017

(22) Filed: Aug. 23, 2019

(65) Prior Publication Data

US 2020/0106917 A1    Apr. 2, 2020

(30) Foreign Application Priority Data

Oct. 1, 2018    (JP) .................................. 2018-186844

(51) Int. Cl.
| | |
|---|---|
| *G06F 15/00* | (2006.01) |
| *G06K 1/00* | (2006.01) |
| *G06K 15/00* | (2006.01) |
| *H04N 1/34* | (2006.01) |
| *G06Q 20/28* | (2012.01) |
| *G06F 3/12* | (2006.01) |

(52) U.S. Cl.
CPC ............ *H04N 1/34* (2013.01); *G06F 3/1239* (2013.01); *G06F 3/1255* (2013.01); *G06F 3/1292* (2013.01); *G06Q 20/28* (2013.01)

(58) Field of Classification Search
CPC ........ H04N 1/34; G06Q 20/28; G06F 3/1239; G06F 3/1255; G06F 3/1292
USPC ................................ 358/1.1, 1.14, 1.13, 1.15
See application file for complete search history.

(56) References Cited

U.S. PATENT DOCUMENTS

2012/0099136 A1*  4/2012  Ueda ..................... G06Q 20/346
                                                            358/1.14
2018/0213267 A1*  7/2018  Khoshbin .......... H04N 21/2187

FOREIGN PATENT DOCUMENTS

JP              2018014551 A       1/2018

* cited by examiner

*Primary Examiner* — Douglas Q Tran
(74) *Attorney, Agent, or Firm* — Buchanan Ingersoll & Rooney PC

(57) ABSTRACT

An image forming apparatus includes: a determination part that performs an accomplishment determination process which is a process of determining whether or not a job is accomplishable prior to a billing process using a pre-billing method which is a billing method of billing for execution of the job before completion of the job; and a decision part that decides whether or not to perform the billing process based on the determination result of the accomplishment determination process, wherein the decision part decides that the billing process is to be performed for the execution of the job when it is determined that the job is accomplishable, and decides that the billing process is not to be performed for the execution of the job when it is determined that the job is not accomplishable.

17 Claims, 16 Drawing Sheets

IMAGE FORMING APPARATUS THAT PERFORMS AN ACCOMPLISHMENT DETERMINATION PROCESS AND NON-TRANSITORY RECORDING MEDIUM STORING COMPUTER READABLE PROGRAM

The entire disclosure of Japanese patent Application No. 2018-186844, filed on Oct. 1, 2018, is incorporated herein by reference in its entirety.

BACKGROUND

Technological Field

The present invention relates to an image forming apparatus such as multi-functional peripheral (MFP), and a technology related to the image forming apparatus.

Description of the Related Art

There is a technology for billing for execution of a job in an MFP after the job is completed (see JP 2018-14551 A). Such a billing method is referred to as a "post-billing method".

In the post-billing method, even though a deficiency of consumables occurs during the execution of the job (for example, copy job) and the job is not accomplished, since a billing process for the execution of the job is not performed yet, a refund process of refunding the amount of money to be billed to a user in a whole or a part does not occur.

However, it is considered that the amount of money for the execution of the job in the MFP is not billed after the job is completed and is billed before the job is completed. Such a billing method is referred to as a "pre-billing method". For example, when the billing process is performed by electronic payment instead of cash payment using a coin vendor, the pre-billing method is adopted.

When the billing process using the pre-billing method is performed, the job is executed in the MFP as follows. Here, it is assumed that an execution command of a print-out job (specifically, copy job) is received.

Initially, the MFP generates scan data by performing a read process of documents according to an execution start command of the copy job conducted by the user. The MFP does not immediately perform printing based on the scan data, and performs the printing based on the scan data after the billing process for the execution of the copy job is completed. For example, when an execution command of a copy job for copying 100 documents is received, after the billing process for the execution of the copy job is performed, the printing based on the scan data of 100 documents is started.

However, in such a pre-billing method, when the deficiency of consumables (out of sheets) occurs during the execution of the job (specifically, during the printing) and the job is not accomplished, a refund process of refunding the amount of money billed to the user in a where or a part may occur. For example, when the deficiency of the consumables occurs at a point of time when 70 documents out of 100 documents are printed out and the remaining documents (30 documents) are not printed out, the refund process of refunding the amount of money billed for the execution of the printing regarding the remaining documents may occur.

Even though such a refund process occurs, when the billing process using the electronic payment is adopted in the MFP, a person in charge of a store where the MFP is provided needs to perform the refund process, and it takes time and effort.

SUMMARY

Thus, an object of the present invention is to provide a technology capable of suppressing the occurrence of the refund process in the pre-billing method.

To achieve the abovementioned object, according to an aspect of the present invention, an image forming apparatus reflecting one aspect of the present invention comprises: a determination part that performs an accomplishment determination process which is a process of determining whether or not a job is accomplishable prior to a billing process using a pre-billing method which is a billing method of billing for execution of the job before completion of the job; and a decision part that decides whether or not to perform the billing process based on the determination result of the accomplishment determination process, wherein the decision part decides that the billing process is to be performed for the execution of the job when it is determined that the job is accomplishable, and decides that the billing process is not to be performed for the execution of the job when it is determined that the job is not accomplishable.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

1. First Embodiment

1-1. System Configuration

Figure 1:
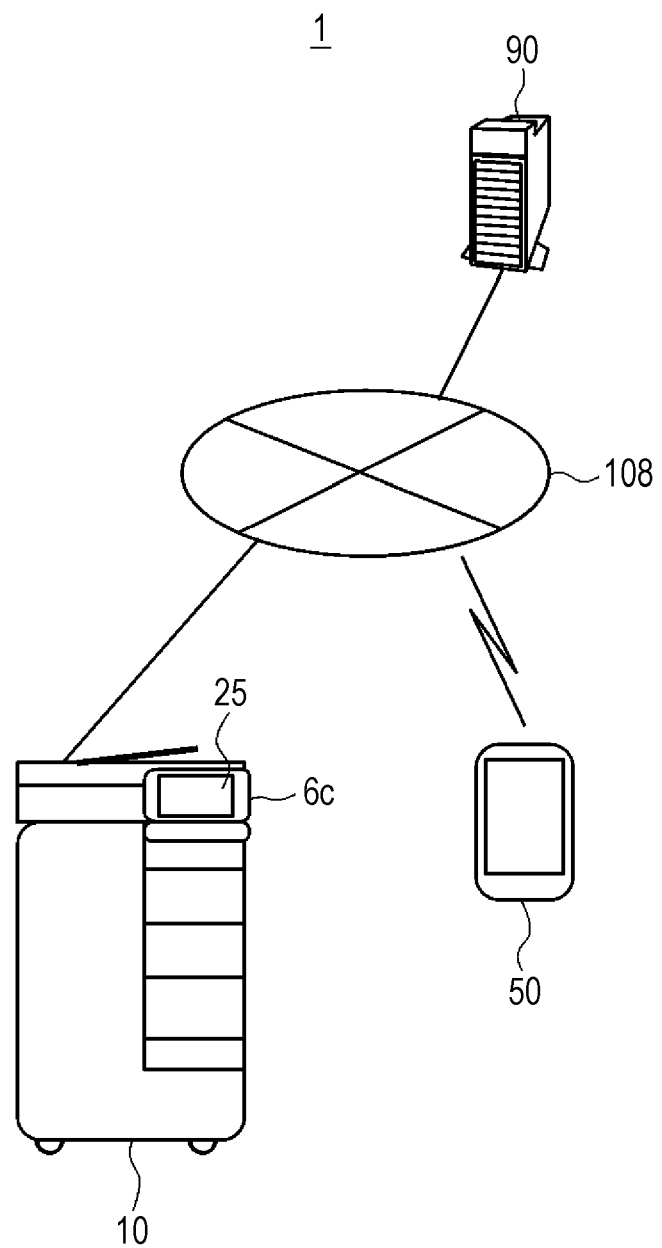
FIG. 1 is a schematic diagram illustrating a configuration of a billing system.

FIG. 1 is a schematic diagram illustrating a configuration of a billing system 1 according to an embodiment of the present invention. As illustrated in FIG. 1, the billing system 1 includes a multi-functional peripheral (referred to as an MFP) 10, a billing server 90, and a mobile terminal 50.

These apparatuses 10, 50, and 90 in the present system 1 are connected via a network 108 so as to communicate with each other. The network 108 is formed by a local area network (LAN) and the Internet. These apparatuses may be connected to the network 108 in a wired manner or a wireless manner.

The billing server 90 is an external apparatus (external server) separately provided from the MFP 10. The billing server 90 is an apparatus capable of performing a billing process. Each apparatus name (apparatus ID) of the MFP 10 and an IP address of the MFP 10 are registered in association with each other in the billing server 90.

The mobile terminal 50 is an apparatus (information equipment) capable of performing a cooperation operation with the billing server 90. Application software capable of performing the cooperation operation with the billing server 90 is installed on the mobile terminal 50, and the mobile terminal 50 performs the cooperation operation with the billing server 90 by using the application software. The mobile terminal 50 has an imaging part (imaging function), and the mobile terminal 50 can read (recognize) a two-dimensional barcode by using the imaging part.

The billing server 90 performs the billing process by cooperating with the mobile terminal 50 as follows.

Initially, when the amount of money to be billed for execution of a job is calculated in the MFP 10, the two-dimensional barcode is displayed on a touch panel 25 of the MFP 10. Billing information including the amount of money to be billed and a billing target apparatus (specifically, the apparatus ID of the MFP 10) of the amount of money to be billed is included in the two-dimensional barcode. The mobile terminal 50 reads (recognizes) the two-dimensional barcode by using the imaging part, and obtains the amount of money to be billed included in the two-dimensional barcode. The mobile terminal 50 transmits the billing information obtained from the two-dimensional barcode to the billing server 90. The billing server 90 performs the billing process of the amount of money to be billed based on the billing information received from the mobile terminal 50. The billing server 90 transmits a billing completion notification (notification indicating that the billing process is completed) to the MFP 10 in response to completion of the billing process. Specifically, the billing server 90 transmits the billing completion notification to the MFP 10 based on the IP address (the IP address of the MFP 10) associated with the apparatus ID of the MFP 10.

In the billing system 1, such a billing operation is performed before completion of the job is completed in the MFP 10. Specifically, in the billing system 1, a "pre-billing method" is adopted as a billing method of billing for the execution of the job. The pre-billing method is a billing method of billing for the execution of the job before the job is completed (specifically, before an output process is started in the job).

Specifically, the MFP 10 performs the aforementioned operations (the calculation operation of the amount of money to be billed and the display operation of the two-dimensional barcode) before the job is completed. In response to reception of the billing completion notification from the billing server 90 (when the billing completion notification is received), the MFP 10 performs the output process in the job (the job is accomplished).

1-2. Configuration of MFP 10

Figure 2:
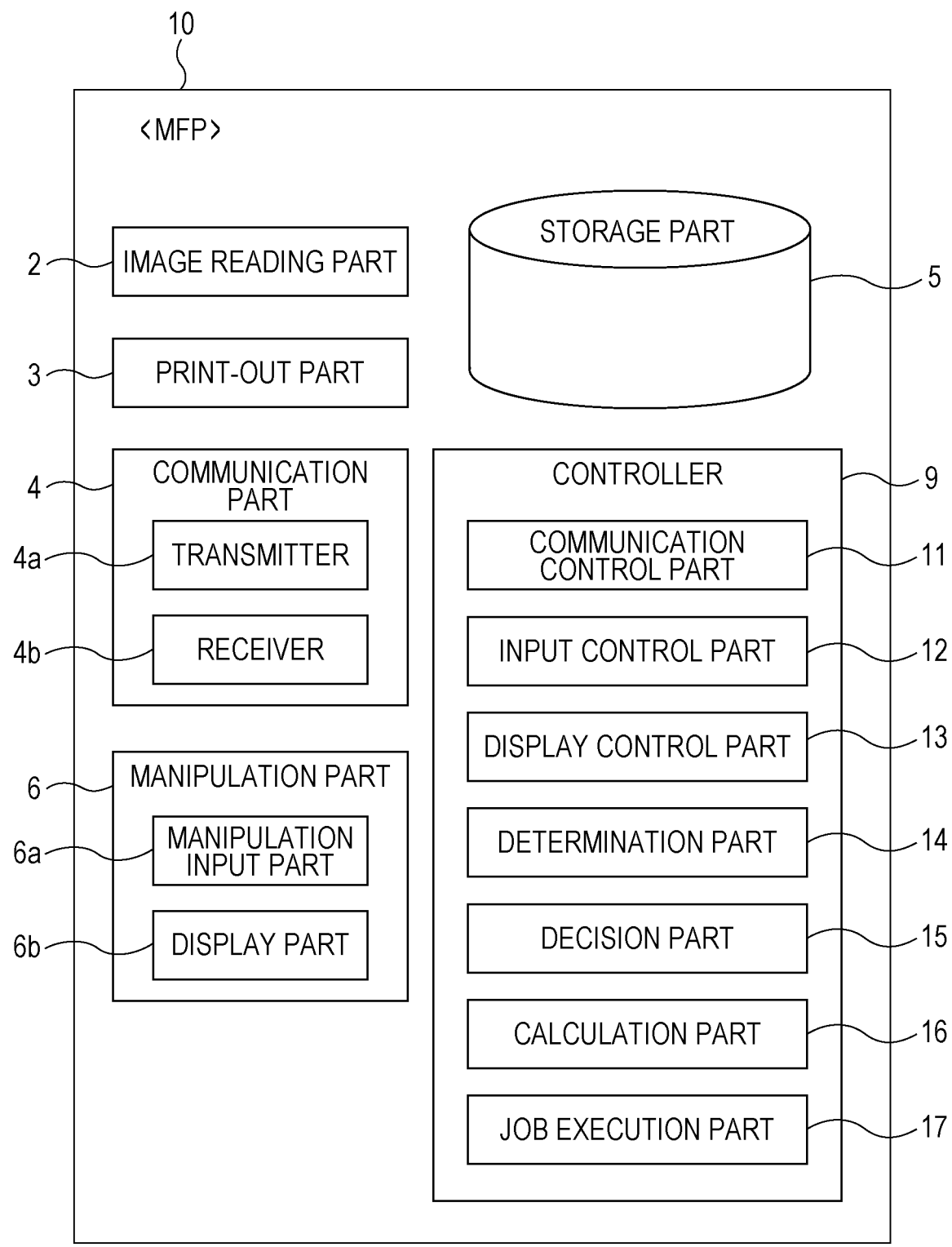
FIG. 2 is a diagram illustrating functional blocks of an MFP (image forming apparatus)

FIG. 2 is a diagram illustrating functional blocks of the MFP 10.

The MFP 10 is an apparatus (referred to as a multifunctional machine) having a scan function, a copy function, a facsimile function, and a box storage function. Specifically, as illustrated in the functional block diagram of FIG. 2, the MFP 10 includes an image reading part 2, a print-out part 3, a communication part 4, a storage part 5, a manipulation part 6, and a controller 9 (control part), and implements various functions by operating these parts in a multifunctional manner. The MFP 10 is referred to as an image forming apparatus, an image processing apparatus, or a print-out apparatus.

The image reading part 2 is a processing part that optically reads (that, scans) documents placed at a predetermined position (auto document feeder (ADF) or glass surface) of the MFP 10 and generates image data (referred to as document image data or scan data) of the documents.

The print-out part 3 is an output part that performs a process (referred to as a print-out process) of printing out an image on various media such as a paper based on image data related to printing target data.

The communication part 4 is a processing part capable of performing facsimile communication via a public line. The communication part 4 can perform network communication via the network 108. In the network communication, various protocols such as the Transmission Control Protocol/the Internet Protocol (TCP/IP) and File Transfer Protocol (FTP) are used, and the network communication is used. Thus, the MFP 10 can transmit and receive various data to and from a desired destination (billing server 90).

The communication part 4 includes a transmitter 4a that transmits various data and a receiver 4b that receives various data.

The storage part 5 is formed by a storage device such as a hard disk drive (HDD).

The manipulation part 6 includes a manipulation input part 6a that receives a manipulation input for the MFP 10, and a display part 6b that displays and outputs various information. In the MFP 10, a substantially plate-like manipulation panel part 6c (see FIG. 1) is provided, and the manipulation panel part 6c includes a touch panel (manipulation panel) 25 (see FIG. 1) on a front surface. The touch panel 25 is formed such that a piezoelectric sensor is embedded in a liquid crystal display panel, and can display various information and receive a manipulation input from a manipulator.

The controller (control part) 9 is a control device that is built in the MFP 10 and generally controls the MFP 10. The controller 9 is formed as a computer system including a CPU and various semiconductor memories (RAM and ROM). The CPU executes a predetermined software program (hereinafter, simply referred to as a program) stored in the ROM (for example, EEPROM), and thus, the controller 9 implements various processing parts. The program (specifically, a program module group) may be installed on a portable recording medium such as a USB memory or the MFP 10 via the network 108.

Specifically, as illustrated in FIG. 2, the controller 9 implements various processing parts including a communication control part 11, an input control part 12, a display control part 13, a determination part 14, a decision part 15, a calculation part 16, and a job execution part 17 by executing the program.

The communication control part 11 is a processing part that controls a communication operation with another apparatus (billing server 90).

The display control part 13 is a processing part that controls a display operation on the display part 6b (touch panel 25). For example, the display control part 13 controls a display operation for displaying the two-dimensional barcode on the touch panel 25 of the MFP 10. The amount of money to be billed calculated by the calculation part 16 is included in the two-dimensional barcode.

The input control part 12 is a processing part that controls a manipulation input operation performed on the manipulation input part 6a.

The determination part 14 is a processing part that performs various determination operations. For example, the determination part 14 performs a process (referred to as an accomplishment determination process) of determining whether or not the job is accomplishable.

The decision part 15 is a processing part that performs a decision operation for deciding whether or not to perform the billing process in the billing server 90 based on the determination result of the accomplishment determination process).

The calculation part 16 is a processing part that performs a calculation process of calculating the amount of money to be billed for the execution of the job.

The job execution part 17 is a processing part that controls a job execution operation.

Here, although it has been described that various operations are primarily performed by executing the software program in the CPU of the controller 9, the present invention is not limited thereto. Various operations may be performed by using dedicated hardware provided in the MFP 10 (specifically, the inside or outside of the controller 9). For example, all or a part of the communication control part 11, the input control part 12, the display control part 13, the determination part 14, the decision part 15, the calculation part 16, and the job execution part 17 (FIG. 2) may be implemented by using one or multiple pieces of dedicated hardware.

1-3. Operation

In this embodiment, an aspect in which an execution command of a write job to write processing target data in a write destination device is received is described.

Specifically, an execution command of a write job (referred to as a scan data write job) for optically reading the documents, generating scan data of the documents, and writing the scan data (processing target data) in a write destination device is received. Examples of the write destination device in the write job include a portable recording medium such as a USB memory. The job for writing the scan data of the documents in the USB memory is referred to as a "Scan to USB" job.

The write destination device in the write job is not limited thereto, and may be an external computer (computer designated by a user). Specifically, due to the use of, for example, Server Message Block (SMB) protocol, the processing target data (the scan data of the documents) may be transmitted to a destination (a computer of a transmission destination) designated by the user, and may be written (stored) in the computer (write destination device) of the transmission destination. The job for writing (transmitting and storing) the scan data in the external computer by using the SMB is referred to as a "Scan to SMB" job.

Figure 3:
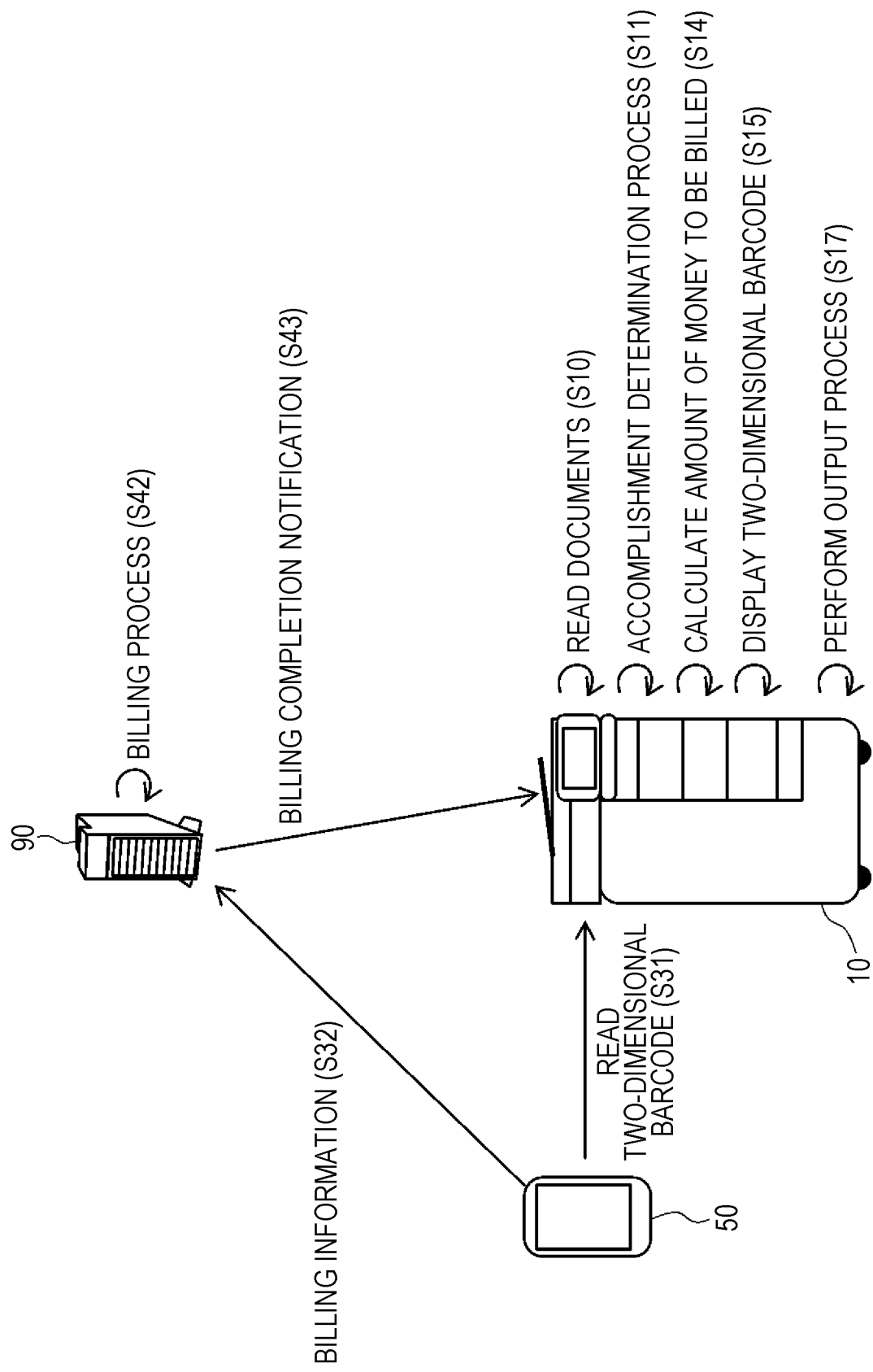
FIG. 3 is a diagram illustrating a schematic operation (example) of the billing system.
Figure 4:
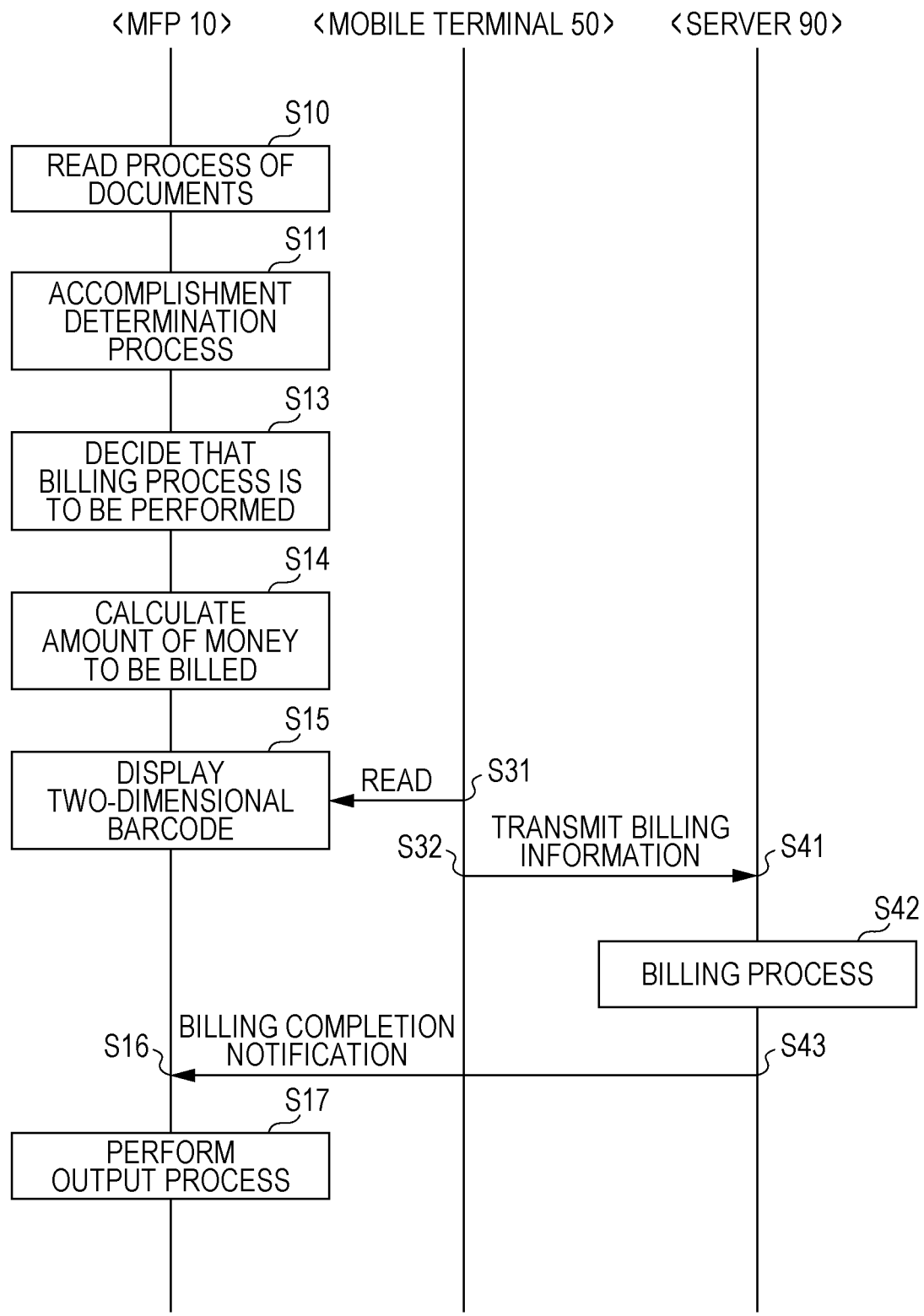
FIG. 4 is a timing chart illustrating an example of an operation of the billing system.
Figure 5:
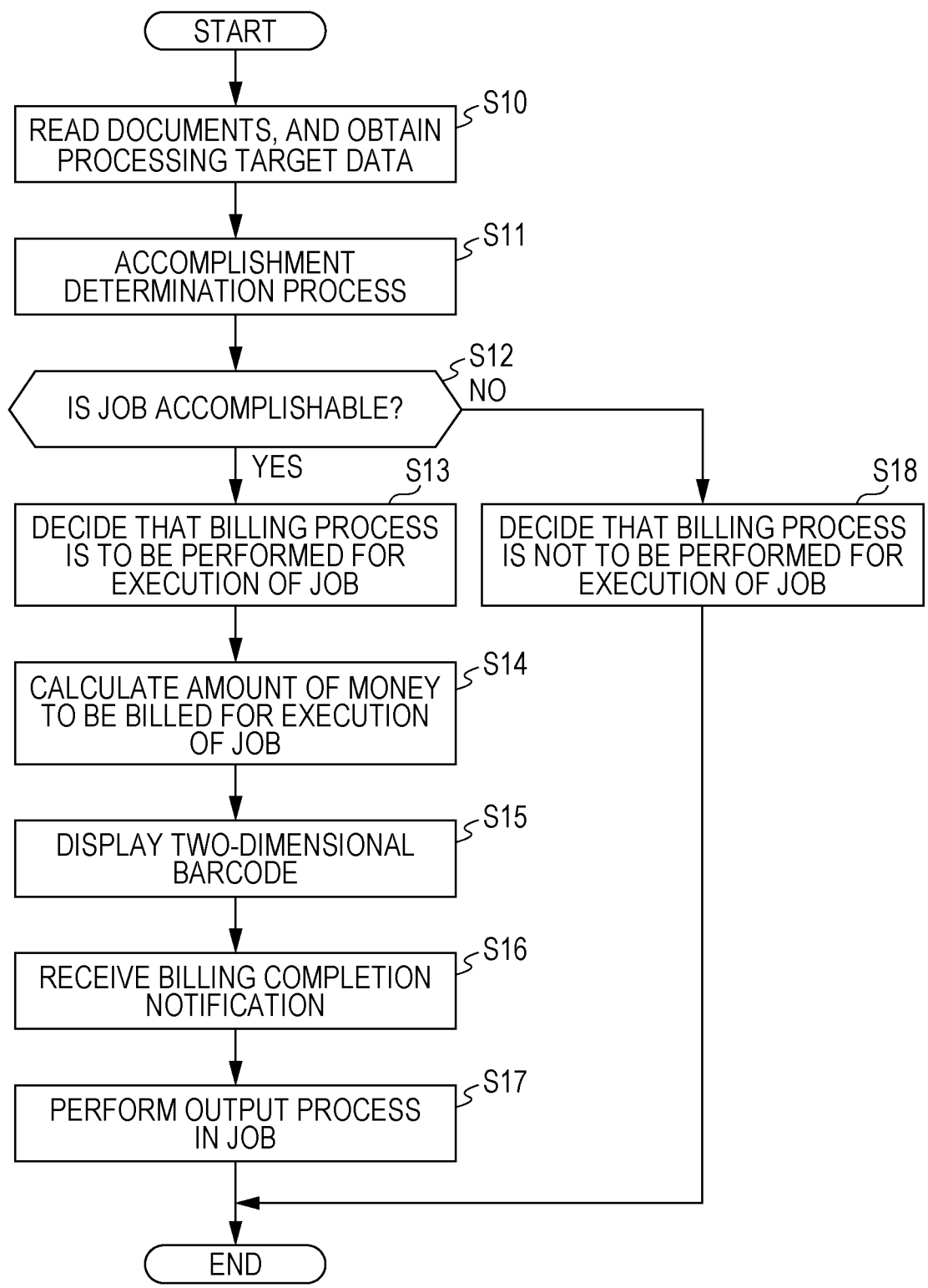
FIG. 5 is a flowchart illustrating an operation of the MFP.

FIG. 5 is a flowchart illustrating the operation of the MFP 10. FIG. 3 is a diagram illustrating a schematic operation (example) of the billing system 1. FIG. 4 is a timing chart illustrating an example (specifically, an operation when the billing process is performed for the execution of the job) of the operation of the billing system 1.

In this billing system 1, prior to the billing process using the pre-billing method (step S42 (see FIGS. 3 and 4)), the MFP 10 determines whether or not the job is accomplishable (step S11).

When it is determined whether or not the job is accomplishable, the MFP 10 decides that the billing process is to be performed for the execution of the job (step S13). The billing process (step S42) is performed in the billing server 90, the output process (step S17) in the job is performed in the MFP 10 after the billing process is completed (see FIGS. 3 and 4).

Meanwhile, when it is determined that the job is not accomplishable, the MFP 10 decides that the billing process is not to be performed for the execution of the job (step S18 (FIG. 5)). In this case, the billing process (step S42) is not performed in the billing server 90, and the output process (step S17) in the job is not performed.

The details of such operations will be described below.

The user places the documents at the predetermined position (for example, ADF) of the MFP 10, and conducts a setting manipulation of the write job (specifically, scan data write job) by using the touch panel 25 of the MFP 10. In the setting manipulation, setting contents of setting items such as read resolution are set. The user presses, for example, a "start" button (not illustrated), and gives an execution start command of the write job.

When the setting manipulation and the execution start command of the write job are received, the MFP 10 starts the operation of FIG. 5.

In step S10, the MFP 10 generates and obtains the scan data of the documents by performing a read process of the documents. The scan data is obtained as processing target data (output target data) of the output process (specifically, a write process for the write destination device) in the write job. The write process is not immediately performed in response to the generation of the scan data, and is performed in response to the completion of the billing process in the billing server 90 as will be described below after the scan data is temporarily stored in the MFP 10.

In step S11, the MFP 10 performs a process (accomplishment determination process) of determining whether or not the write job is accomplishable.

Specifically, the MFP 10 estimates whether or not an accomplishment inhibition factor (error) is to occur in executing the write job (specifically, the output process in the write job). The accomplishment inhibition factor is a factor that inhibits the accomplishment of the job. Examples of the accomplishment inhibition factor regarding the write job include an insufficient capacity of the write destination device (specifically, USB memory) and/or failure of the write destination device. The MFP 10 performs the accomplishment determination process. Specifically, the MFP 10 determines whether or not the write job is accomplishable based on the estimation result of whether or not the accomplishment inhibition factor is to occur.

Figure 6:
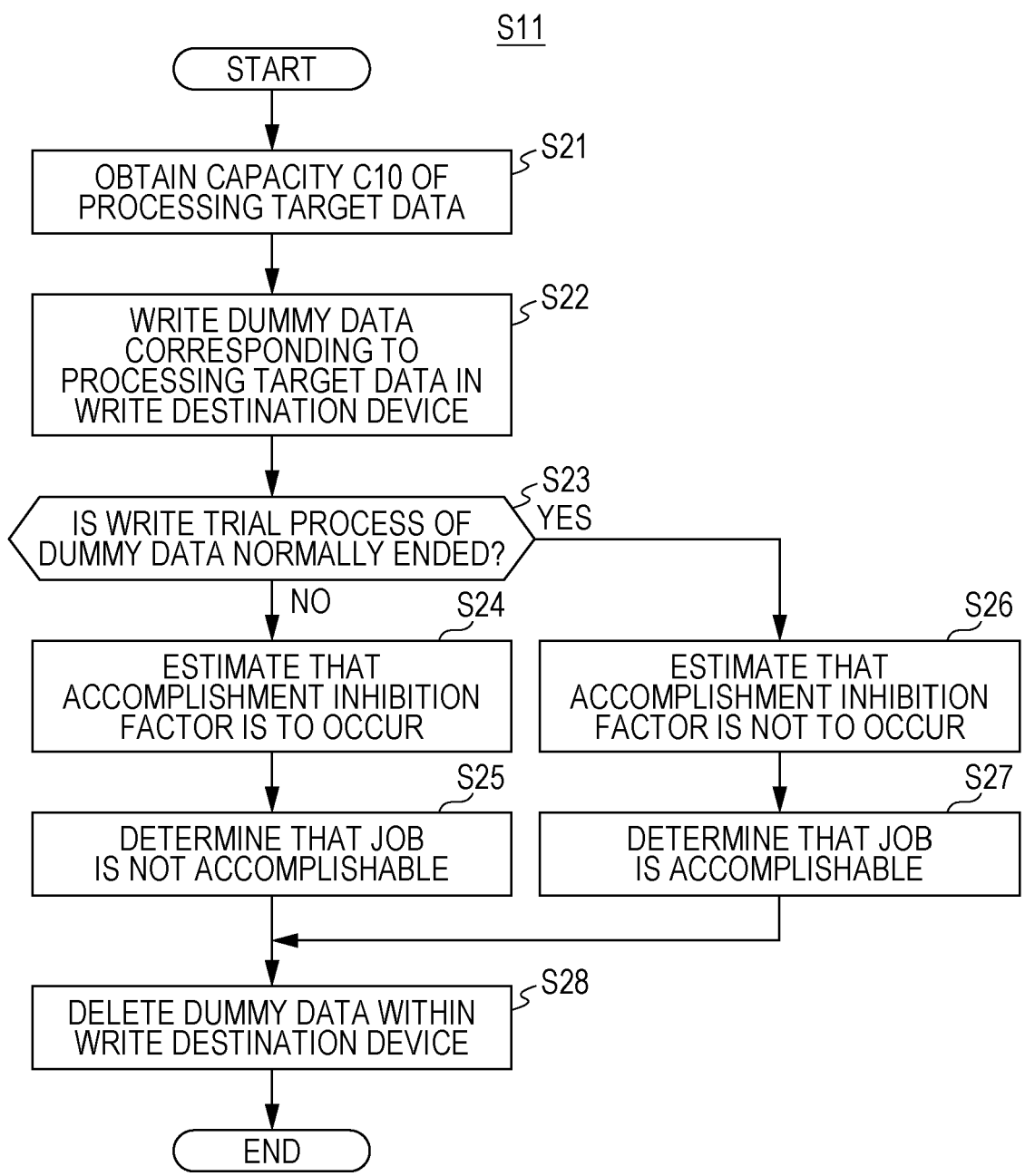
FIG. 6 is a diagram illustrating a subroutine of an accomplishment determination process.

FIG. 6 is a diagram illustrating of a subroutine process of the accomplishment determination process (the accomplishment determination process regarding the write job) (step S11).

Initially, in step S21, the MFP 10 obtains a data capacity C10 of the scan data (the processing target data of the write job) based on the scan data generated in step S11 (FIG. 5).

In step S22, the MFP 10 writes not the scan data itself but dummy data corresponding to the scan data in the write destination device (USB memory) on a trial basis. Such a trial write operation (write process) using the dummy data is referred to as a write trial operation (write trial process).

Specifically, the MFP 10 generates dummy data having the same capacity as the capacity C10 of the scan data, and writes the dummy data in the write destination device. That is, the dummy data corresponding to the scan data is written in the write destination device instead of actually writing the scan data of the documents in the write destination device. Accordingly, when the scan data is actually written in the write destination device, the MFP 10 estimates (predicts) whether or not the accomplishment inhibition factor (the insufficient capacity of the write destination device and/or the failure of the write destination device) is to occur. When it is detected that the USB memory is not inserted in performing the write process of the dummy data for the USB memory, the user is requested to conduct an insertion manipulation of the USB memory. The write trial operation is performed after the user inserts the USB memory.

The process proceeds from step S22 to step S23.

In step S23, the MFP 10 determines whether or not the write process of the dummy data for the write destination device is normally ended.

For example, when a remaining capacity (free capacity) C20 of the write destination device is smaller than a capacity of the dummy data (that is, the capacity C10 of the scan data) (C20<C10), the accomplishment inhibition factor (specifically, the insufficient capacity of the write destination device) occurs in performing the write process (write trial process) of the dummy data, and the write trial process is not normally ended. When the failure occurs in the write destination device, the accomplishment inhibition factor (specifically, the failure in the write destination device) occurs in performing the write trial process of the dummy data, and the write trial process is not normally ended.

As stated above, when the accomplishment inhibition factor (specifically, the insufficient capacity of the write destination device and/or the failure of the write destination device) occurs in the write trial process of the dummy data for the write destination device, the write trial process is not normally ended. In this case, the MFP 10 estimates that the accomplishment inhibition factor of the write job is to occur in performing the write job (specifically, the write process (referred to as the actual write process) in the write job) of the actual scan data, and advances the process from step S23 to step S24. In step S24, the MFP 10 estimates that the accomplishment inhibition factor is to occur in executing the write job (specifically, the write process of the scan data for the write destination device).

In step S25, the MFP 10 determines that the write job is not accomplishable. Thereafter, after a deletion process (step S28) of the dummy data within the write destination device is performed, the process proceeds to step S12 of FIG. 5. The operations of step S12 and subsequent steps will be described.

Meanwhile, when any accomplishment inhibition factor is not to occur in the write process (write trial process) of the dummy data for the write destination device, the write trial process is normally ended. In this case, the process proceeds from step S23 to step S26, and the MFP 10 estimates that the accomplishment inhibition factor is not to occur in executing the write job (specifically, the write process of the scan data for the write destination device) of the actual scan data.

In step S27, the MFP 10 determines that the write job is accomplishable.

Thereafter, after a deletion process (step S28) of the dummy data within the write destination device is performed, the process proceeds to step S12 of FIG. 5.

In step S12 of FIG. 5, the MFP 10 performs a branch process according to the determination result in the accomplishment determination process.

When it is determined that the write job is accomplishable in step S27 (FIG. 6), the process proceeds from step S12 to step S13.

In step S13, the MFP 10 decides that the billing process is to be performed for the execution of the write job (the write process in the write job is to be performed by performing the billing process). The process proceeds from step S13 to step S14.

In step S14, the MFP 10 calculates the amount of money to be billed for the execution of the write job (see FIGS. 3 and 4). The amount of money to be billed is calculated based on the number of written sheets in the write job.

The MFP 10 displays the two-dimensional barcode on the touch panel 25 of the MFP 10 (step S15) (see FIGS. 3 and 4). The billing information including the amount of money to be billed calculated in step S14 and the billing target apparatus (specifically, the apparatus ID of the MFP 10) of the amount of money to be billed is included in the two-dimensional barcode.

The user reads the two-dimensional barcode into the imaging part of the mobile terminal 50, and the mobile terminal 50 performs a read process (recognition process) of the two-dimensional barcode (step S31) (see FIGS. 3 and 4). The mobile terminal 50 obtains the billing information from the two-dimensional barcode, and transmits the billing information to the billing server 90 (step S32).

When the billing information is received from the mobile terminal 50 (step S41), the billing server 90 performs the billing process of the amount of money to be billed for the execution of the write job based on the billing information (step S42) (see FIGS. 3 and 4). Thereafter, the billing server 90 obtains the IP address (the IP address of the MFP 10) associated with the apparatus ID of the MFP 10 based on the billing information, and transmits the billing completion notification to the MFP 10 in response to the completion of the billing process (step S43).

When the billing completion notification is received from the billing server 90 (step S16 (FIG. 5)), the MFP 10 performs the output process in the write job (step S17) (see FIGS. 3 and 4). Specifically, the MFP 10 performs the write process of the scan data (processing target data) for the write destination device (specifically, USB memory).

As stated above, when it is determined that the write job is accomplishable in step S27 (FIG. 6), the processes of steps S12 to S17 are performed.

Meanwhile, when it is determined that the write job is not accomplishable in step S25 (FIG. 6), the process proceeds from step S12 (FIG. 5) to step S18.

In step S18, the MFP 10 decides that the billing process is not to be performed for the execution of the write job.

Figure 9:
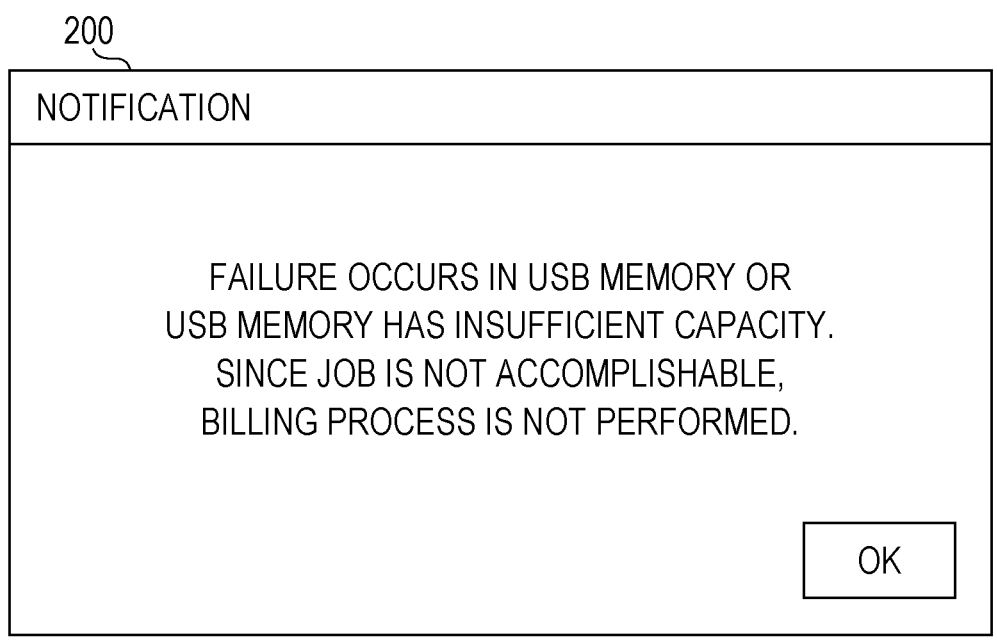
FIG. 9 is a diagram illustrating a notification screen.

The MFP 10 notifies the user that the billing process is not performed for the execution of the write job in step S18. Specifically, the MFP 10 displays a notification screen 200 (FIG. 9) on the touch panel 25 of the MFP 10. A notification (referred to as a billing non-execution notification) indicating that the billing process is not performed for the execution of the write job is displayed on the notification screen 200.

The operation of FIG. 5 is ended. That is, the billing process (step S42 (FIG. 3)) for the execution of the write job is not performed, and the output process (step S17) in the write job is not performed.

As stated above, in the first embodiment, it is determined whether or not the job is accomplishable prior to a pre-billing process (step S11 (FIG. 5)). When it is determined that the job is accomplishable, it is decided that the billing process is to be performed for the execution of the job (step S13). Meanwhile, when it is determined that the job is not accomplishable, it is decided that the billing process is not to be performed for the execution of the job (step S18). As a result, the output process (step S17) in the job is not performed, and the billing process (step S42 (FIGS. 3 and 4)) for the execution of the job is not performed. Accordingly, it is possible to suppress the occurrence of a refund process in the pre-billing method.

1-4. First Modification Example of First Embodiment

Although it has been described in the first embodiment that when it is determined that the job is not accomplishable (step S11 (FIG. 5)), it is constantly decided that the billing process is not to be performed for the execution of the job (step S18), the present invention is not limited thereto.

For example, even though it is determined once that the job is not accomplishable, when it is determined that the job is accomplishable in the accomplishment determination process performed again after an occurrence avoidance manipulation (to be described below) of the accomplishment inhibition factor is conducted by the user, it may be decided that the billing process is to be performed for the execution of the job.

Figure 10:
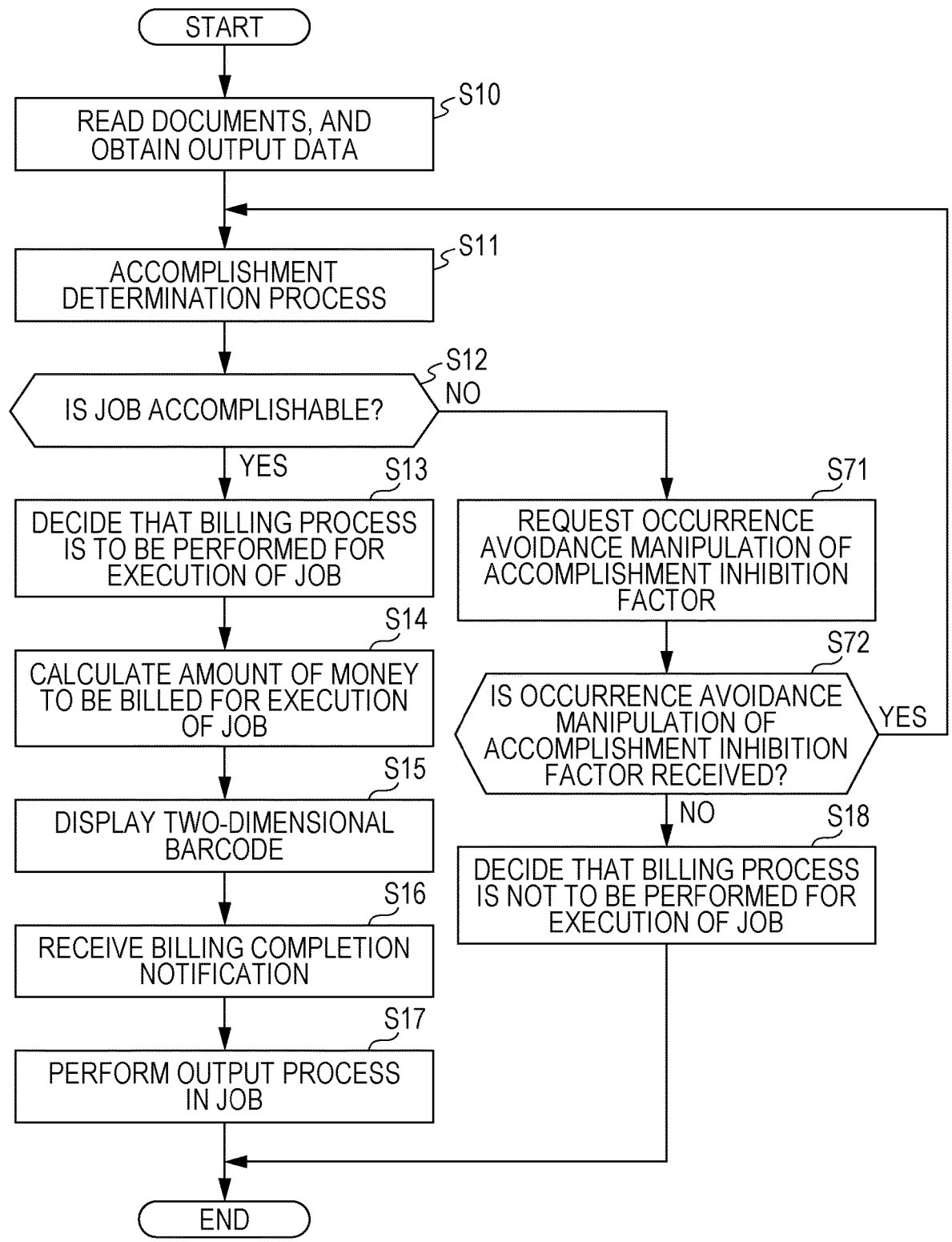
FIG. 10 is a flowchart illustrating an operation of the MFP according to a first modification example of a first embodiment.

FIG. 10 is a flowchart illustrating an operation of the MFP 10 according to this modification example. As illustrated in FIG. 10, in this modification example, the processes of steps S71 and S72 are added between step S12 and step S18.

Specifically, initially, when it is determined that the job (write job) is not accomplishable in response to the estimation of the occurrence of the accomplishment inhibition factor in step S11 (specifically, step S25 (FIG. 6)), the process proceeds from step S12 to step S71.

In step S71, the MFP 10 requests the user to perform a manipulation (referred to as an occurrence avoidance manipulation) for avoiding the occurrence of the accomplishment inhibition factor (specifically, the insufficient capacity of the USB memory and/or the failure of the USB memory).

Figure 11:
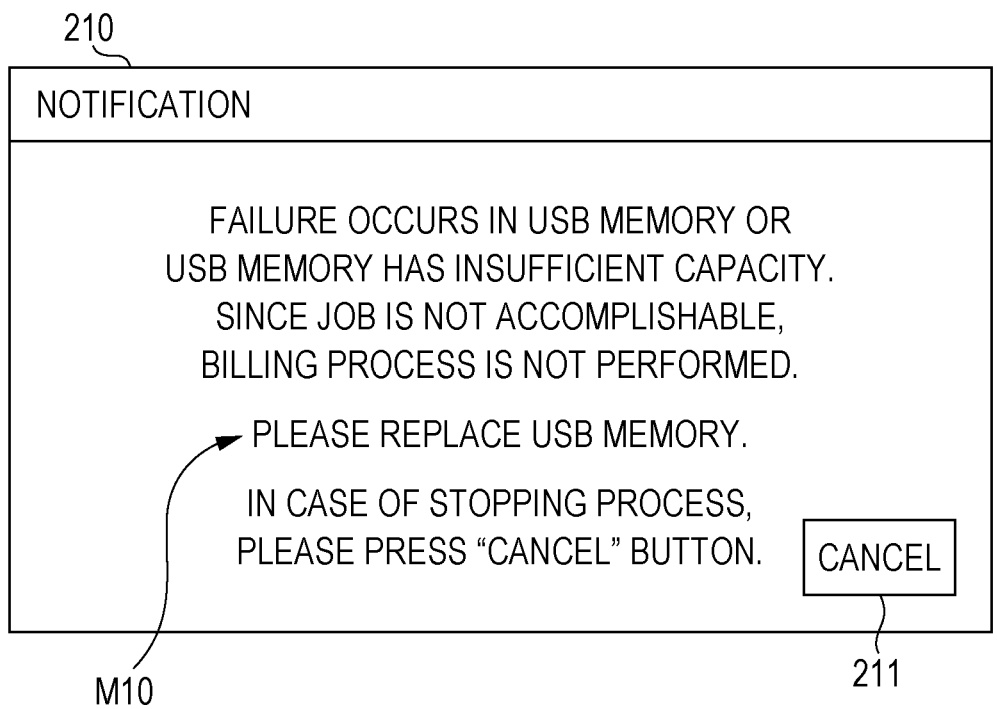
FIG. 11 is a diagram illustrating a notification screen according to the first modification example of the first embodiment.

FIG. 11 is a diagram illustrating a notification screen 210 (200) according to this modification example. On the notification screen 210, the billing non-execution notification is displayed, and a message M10 for requesting the occurrence avoidance manipulation corresponding to the accomplishment inhibition factor regarding the write job (specifically, "Scan to USB" job) is displayed. For example, the user is requested to conduct, as the occurrence avoidance manipulation, a replacement manipulation of the USB memory. The present invention is not limited thereto, and the user may be requested to conduct, as the occurrence avoidance manipulation, a setting change manipulation (for example, a manipulation for decreasing read resolution) for reducing the capacity C10 of the scan data of the documents.

After the user is requested to conduct the occurrence avoidance manipulation of the accomplishment inhibition factor in this manner, the process proceeds to from step S71 to step S72, and it is determined whether or not the occurrence avoidance manipulation of the accomplishment inhibition factor is received.

For example, when the replacement manipulation of the USB memory is not detected and a cancel button 211 (FIG. 11) is pressed, it is determined that the occurrence avoidance manipulation of the accomplishment inhibition factor is not received. The process proceeds from step S72 to step S18. The processes of step S18 and subsequent steps are the same as those in the first embodiment.

Meanwhile, when the replacement manipulation of the USB memory is detected, it is determined that the occurrence avoidance manipulation of the accomplishment inhibition factor is received. The notification screen 210 is removed (is not displayed), and the process returns to step S11 from step S72. The MFP 10 performs the accomplishment determination process again. The processing contents of the accomplishment determination process is the same as that in the first embodiment (see FIG. 6). When the user is requested to conduct, as the occurrence avoidance manipulation, the setting change manipulation of the write job, the process returns to step S10 from step S72. After the read process of the documents is performed again based on a changed setting condition, the accomplishment determination process is performed again.

When it is determined that the write job is accomplishable in the accomplishment determination process performed again after the occurrence avoidance manipulation, the process proceeds to step S13 from step S11 via step S12, and it is decided that the billing process is to be performed for the execution of the write job.

As stated above, even though it is determined once that the job is not accomplishable, when it is determined that the job is accomplishable in the accomplishment determination process performed again (step S11) after the occurrence avoidance manipulation, it is decided that the billing process is to be performed for the execution of the job (step S13). After the billing process (step S42 (FIG. 3)) in the billing server 90, the output process (specifically, the write process in the write job) in the job is performed in the MFP 10 (step S17). Accordingly, it is possible to suppress the occurrence of the refund process while increasing a possibility of the job accomplishment.

1-5. Second Modification Example of First Embodiment

Although it has been described in the first embodiment that it is estimated whether or not the accomplishment inhibition factor (the insufficient capacity of the write destination device and/or the failure the write destination device) is to occur during the execution of the write job by writing the dummy data corresponding to the scan data of the documents is written in the write destination device (step S22 (FIG. 6)), the present invention is not limited thereto.

For example, it may be estimated whether or not the accomplishment inhibition factor (the insufficient capacity of the write destination device) is to occur during the execution of the write job by comparing the capacity C10 of the scan data (processing target data) of the documents with the writable remaining capacity (free capacity) C20 of the write destination device.

Specifically, when the capacity C10 of the scan data of the documents is smaller than the remaining capacity C20 of the write destination device (C10<C20), it is estimated that the accomplishment inhibition factor (specifically, the insufficient capacity of the write destination device) is not to occur, and it is determined that the job is accomplishable. Meanwhile, when the capacity C10 of the scan data is larger than the remaining capacity C20 of the write destination device (C10>C20), it is estimated that the accomplishment inhibition factor is to occur, and it is determined that the job is not accomplishable.

Accordingly, since it is checked in advance that the job accomplishment is not inhibited due to the insufficient capacity of the write destination device, it is possible to avoid the occurrence of the refund process caused by the insufficient capacity of the write destination device.

2. Second Embodiment

A second embodiment is a variation example of the first embodiment. Hereinafter, differences from the first embodiment will be primarily described.

In the first embodiment, the execution command of the write job is received.

In contrast, in the following second and third embodiments, an execution command of a job of a kind different from that in the first embodiment is received.

In the second embodiment, an aspect in which an execution command of a print-out job (a job for printing out the processing target data) is received will be described.

Here, a copy job (a job for generating the scan data of the documents and printing out the scan data (processing target data)) is used as an example of the print-out job. The present invention is not limited thereto, and the print-out job may be a box print job (a job for printing out the printing target data (processing target data) stored in the MFP 10).

When an execution command of the print-out job (specifically, copy job) is received, the operation of FIG. 5 is also performed in the MFP 10 as in the first embodiment.

Specifically, when the scan data is obtained by performing the read process of the documents (step S10), it is determined whether or not the print-out job is accomplishable (step S11).

Figure 7:
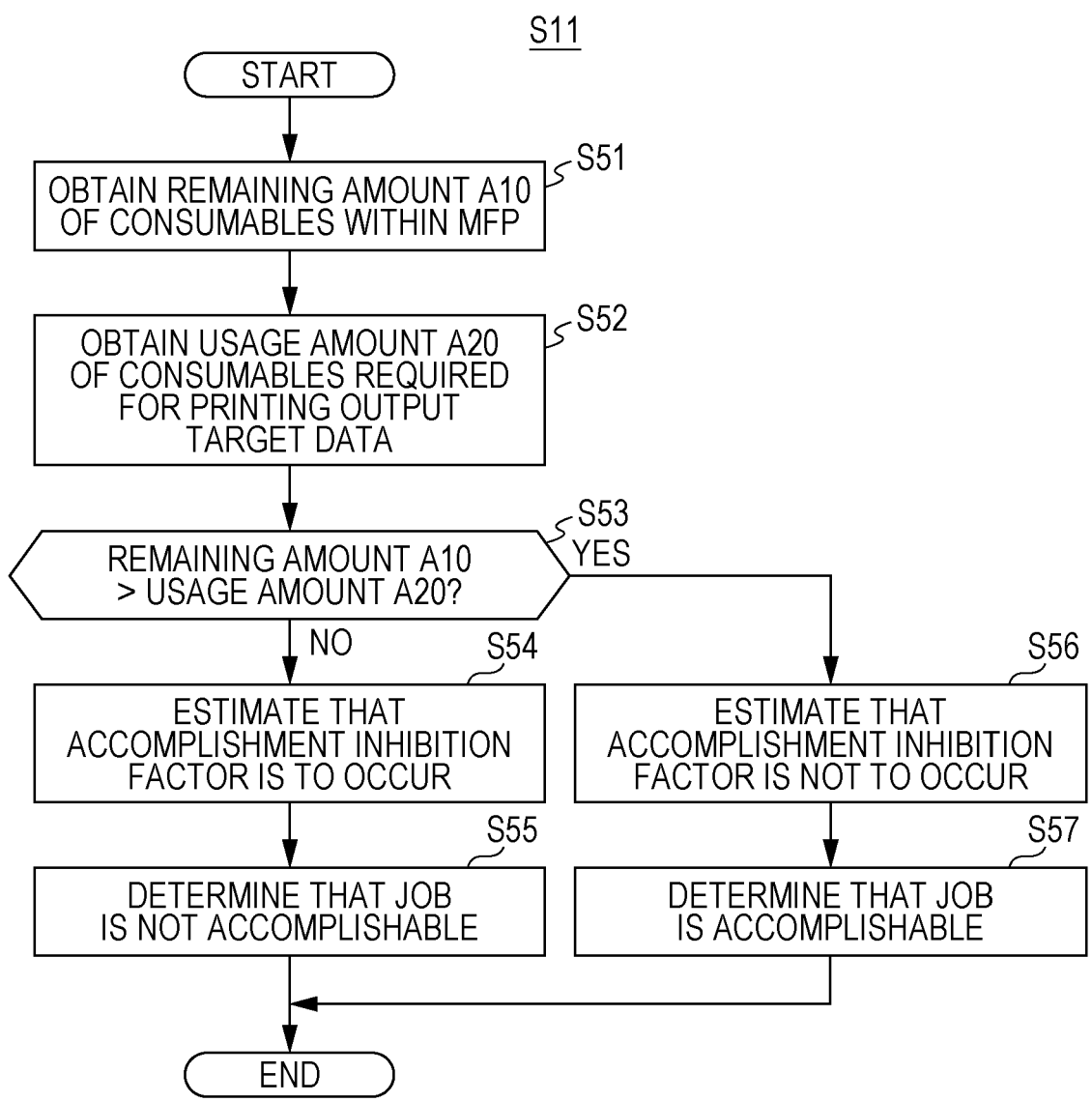
FIG. 7 is a diagram illustrating a subroutine of an accomplishment determination process according to a second embodiment.

FIG. 7 is a diagram illustrating a subroutine process of the accomplishment determination process (step S11) according to the second embodiment.

Initially, in step S51, the MFP 10 obtains a remaining amount A10 (for example, a sheet remaining amount A11 and a toner remaining amount A12) of consumables within the MFP 10.

In step S52, the MFP 10 obtains a consumable usage amount A20 required for accomplishing the print-out job (specifically, performing the print-out process of the scan data) based on the scan data of the documents and the setting contents of the print-out job. For example, a sheet usage amount A21 and a toner usage amount A22 are calculated and obtained based on the number of read documents (that is, the number of printouts in the copy job) and the setting contents of the print-out job (specifically, the setting content of the setting item "double-sided/single-sided" and the setting content of the setting item "color setting").

In step S53, the MFP 10 compares the remaining amount A10 (A11 and A12) of all kinds of consumables with the usage amount A20 (A21 and A22) of all kinds of consumables. In other words, it is estimated whether or not the accomplishment inhibition factor (specifically, a deficiency of consumables) is to occur in performing the print-out process in the print-out job.

Specifically, the sheet remaining amount A11 within the MFP 10 and the sheet usage amount A21 in the print-out job are compared with each other, and the toner remaining amount A12 within the MFP 10 and the toner usage amount A22 in the print-out job are compared with each other.

When it is determined that the remaining amount A10 within the MFP 10 is larger than the usage amount A20 (A10>A20) for all kinds of consumables, the process proceeds from step S53 to step S56. For example, when the sheet remaining amount A11 is larger than the sheet usage amount A21 (A11>A21) and the toner remaining amount A12 is larger than the toner usage amount A22 (A12>A22), the process proceeds from step S53 to step S56.

In step S56, it is estimated that the accomplishment inhibition factor (deficiency of consumables) is not to occur in executing the print-out job. It is determined that the print-out job is accomplishable in step S57, and the process proceeds from step S11 of FIG. 5 to steps S13 to S17 via step S12.

The processing contents of step S13 to S17 are the same as those in the first embodiment. Specifically, it is determined that the billing process is to be performed for the execution of the print-out job in step S13. After steps S14 and S15, in response to the reception of the billing completion notification (step S16), the output process (specifically, the print-out process of the scan data) in the print-out job is performed (step S17).

Meanwhile, when the remaining amount of any kind of consumables is smaller than the usage amount in the print-out job, it is determined that the remaining amount A10 within the MFP 10 is smaller than the usage amount A20 (A10<A20), and the process proceeds from step S53 to step S54. For example, when the sheet remaining amount A11 is smaller than the sheet usage amount A21 (A11<A21) or the toner remaining amount A12 is smaller than the toner usage amount A22 (A12<A22), the process proceeds from step S53 to step S54.

In step S54, it is estimated that the accomplishment inhibition factor (deficiency of consumables) is to occur in executing the print-out job. It is determined that the print-out job is not accomplishable in step S55, and the process proceeds from step S11 of FIG. 5 to step S18 via step S12.

Specifically, it is determined that the billing process is not to be performed for the execution of the print-out job in step S18, and the operation of FIG. 5 is ended without performing the billing process (step S42 (FIG. 3)) (without performing the print-out process (step S17)).

When the execution command of the print-out job is received, the aforementioned operation is performed.

In the second embodiment, the idea of the first modification example of the first embodiment (the idea of requesting the user to perform the occurrence avoidance manipulation of the accomplishment inhibition factor) may be applied. Examples of the occurrence avoidance manipulation of the accomplishment inhibition factor regarding the print-out job include a replenishment manipulation of the consumables (sheet and toner) and/or a setting change manipulation the print-out job. Examples of the setting change manipulation include a manipulation for changing the setting content of the setting item "double-sided/single-sided" from a value "single-sided" to a value "double-sided" (that is, a manipulation for reducing the sheet usage amount) and/or a manipulation for changing the setting content of the setting item "color setting" from a value "full color" to a value "monochrome" (a manipulation for reducing the toner usage amount other than black).

3. Third Embodiment

A third embodiment is a variation example of the first embodiment. Hereinafter, differences from the first embodiment will be primarily described.

In the third embodiment, an aspect in which an execution command of a facsimile transmission job is received is described.

When the execution command of the facsimile transmission job is received, the operation of FIG. 5 is also performed in the MFP 10 as in the first embodiment.

Specifically, the read process of the documents is performed, and the processing target data (scan data) is obtained (step S10). It is determined whether or not the facsimile transmission job is accomplishable (step S11).

Figure 8:
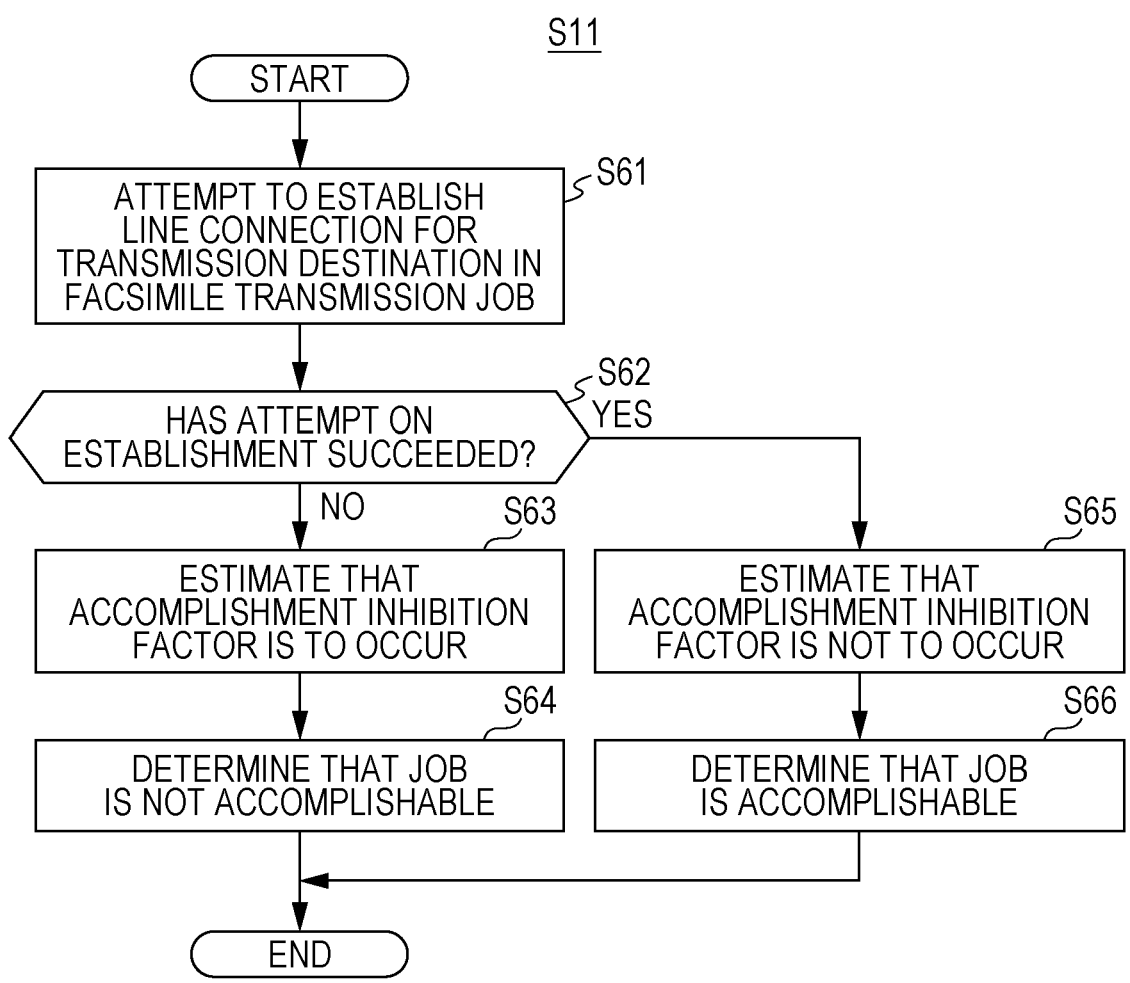
FIG. 8 is a diagram illustrating a subroutine of an accomplishment determination process according to a third embodiment.

FIG. 8 is a diagram illustrating a subroutine process of the accomplishment determination process (step S11) according to the third embodiment.

Initially, in step S61, the MFP 10 attempts to establish a line connection for a transmission destination in the facsimile transmission job based on a facsimile number input in a setting manipulation in the facsimile transmission job. In other words, the connection for the transmission destination in the facsimile transmission job is checked.

In step S62, the MFP 10 determines whether or not the attempt on the establishment of the line connection for the transmission destination has succeeded. In other words, prior to the actual output process in the facsimile transmission job (specifically, immediately before the actual output process), it is checked whether or not the connection for the transmission destination in the facsimile transmission job is able to be established.

When the attempt on the establishment of the line connection for the transmission destination has succeeded, the process proceeds from step S62 to step S65. The MFP 10 estimates that the accomplishment inhibition factor (specifically, a state in which the connection for the transmission destination is not able to be established (referred to as a connection unable state)) is not to occur in executing the facsimile transmission job. It is determined that the facsimile transmission job is accomplishable in step S66, and the process proceeds from step S11 of FIG. 5 to steps S13 to S17 via step S12.

The processing contents of step S13 to S17 are the same as those in the first embodiment. Specifically, it is determined that the billing process is to be performed for the execution of the facsimile transmission job in step S13. After steps S14 and S15, in response to the reception of the billing completion notification from the billing server 90 (step S16), an output process (specifically, a transmission process of the scan data for the transmission destination) in the facsimile transmission job is performed (step S17).

Meanwhile, when the attempt on the line connection for the transmission destination in the facsimile transmission job has failed, the process proceeds from step S62 to step S63, and the MFP 10 estimates that the accomplishment inhibition factor (connection unable state) is to occur. It is determined that the facsimile transmission job is not accomplishable in step S64, and the process proceeds from step S11 of FIG. 5 to step S18 via step S12.

Specifically, it is determined that the billing process is not to be performed for the execution of the facsimile transmission job in step S18, and the operation of FIG. 5 is ended without performing the billing process (step S42 (FIG. 3)) (without performing the facsimile transmission process (step S17).

4. Fourth Embodiment

A fourth embodiment is a variation example of the first embodiment. Hereinafter, differences from the first embodiment will be primarily described.

In the first embodiment, when it is determined that the job is not accomplishable (step S11 (FIG. 5)), it is constantly decided that the billing process is not to be performed for the execution of the entire job (step S18).

In contrast, in the fourth embodiment, even though it is determined that the job (entire job) is not accomplishable, when a part of the entire job is executable, it is decided that the billing process is to be performed for a partial job capable of being executed (referred to as an executable partial job) of the entire job.

Here, an aspect in which the execution command of the write job (specifically, "Scan to USB" job) is received is described as in the first embodiment.

Figure 12:
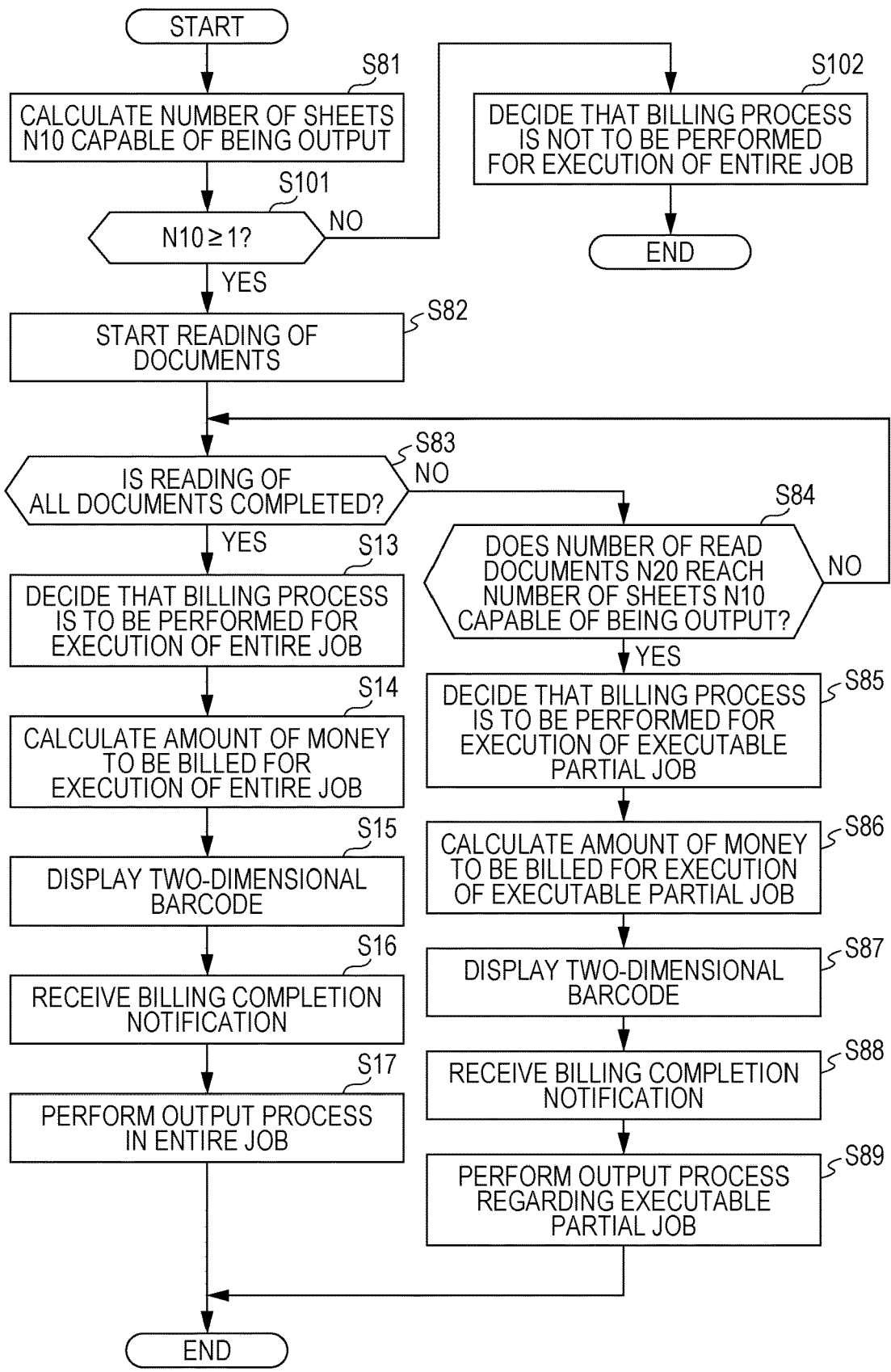
FIG. 12 is a flowchart illustrating an operation of the MFP according to a fourth embodiment.

FIG. 12 is a flowchart illustrating an operation of the MFP 10 according to the fourth embodiment. The operation of FIG. 12 is started in response to the reception of the setting manipulation and the execution start command of the write job.

Initially, in step S81, the MFP 10 calculates the number of sheets (referred to as the number of sheets capable of being output) N10 with which the output process in the job is able to be performed. Here, the number of sheets (referred to as the number of writable sheets) N11 with which the writing for the write destination device (specifically, USB memory) in the write job is able to be performed is calculated.

Specifically, the MFP 10 accesses to the write destination device, and obtains the remaining capacity C20 of the write destination device. The MFP 10 calculates the number of writable sheets N11 (N10) based on the remaining capacity C20 and the setting contents (read resolution) in the write job. The process proceeds from step S81 to step S101.

In step S101, the MFP 10 determines whether or not the number of writable sheets N11 (N10) is equal to or greater than "1".

When the number of writable sheets N11 (N10) is "0", the MFP 10 determines that the write job is not accomplishable, and determines that there is no executable partial job. As in the first embodiment, the MFP 10 decides that the billing process is not to be performed for the execution of the entire write job (step S102).

Meanwhile, when the number of writable sheets N11 (N10) is equal to or greater than "1", the process proceeds from step S101 to step S82, the MFP 10 starts the read process of the documents (step S82). Specifically, the MFP 10 starts the read process of a plurality of documents placed at the ADF.

Thereafter, in steps S83 and S84, the MFP 10 determines whether or not the write job is accomplishable (performs the accomplishment determination process), and determines whether or not there is the executable partial job. Specifically, the processes of steps S83 and S84 are performed whenever the plurality of documents is read one by one.

Initially, in step S83, the MFP 10 determines whether or not the read process of all the documents is completed.

When the read process of all the documents is not completed yet, the process proceeds from step S83 to step S84. The MFP 10 determines whether or not the number of read documents N20 read in the read process reaches the number of writable sheets N11 (N10).

When the number of read documents N20 does not reach the number of writable sheets N11 (N20<N11), after the next document is read, the process returns from step S84 to step S83.

Such operations (the processes of steps S83 and S84) are repeated until the read process of all the documents is completed or the number of read documents N20 reaches the number of writable sheets N11 (N10).

Steps S83 and S84 are repeated in this manner, and thus, the MFP 10 estimates whether or not the accomplishment inhibition factor (specifically, the insufficient capacity of the write destination device) is to occur in executing the write job. Specifically, when the read process of all the documents is completed before the number of read documents N20 reaches the number of writable sheets N11, it is estimated that the insufficient capacity of the write destination device is not to occur in executing the write job. Meanwhile, when the number of read documents N20 reaches the number of writable sheets N11 before the read process of all the documents is completed, it is estimated that the insufficient capacity of the write destination device is to occur in executing the write job.

It is decided that the billing process is to be performed for the execution of a job for writing the scan data of the documents (all the documents or a partial document of all the documents) of all the documents which is read in the read process in the write destination device. That is, it is decided that the billing process is to be performed for the execution up to a part (including the entire write job) on which the write job is executable.

For example, when the number of writable sheets N11 is 70 and the number of all the documents is 20, before the number of read documents N20 reaches the number of writable sheets N11, the number of read documents N20 reaches 20, and the read process of all the documents is completed. In this case, the MFP 10 estimates that the insufficient capacity (accomplishment inhibition factor) of the write destination device is not to occur in executing the write job, and determines that the write job is accomplishable.

The process proceeds from step S83 to step S13 and subsequent steps. The operations of step S13 and subsequent steps are the same as those in the first embodiment (see FIG. 5).

Specifically, it is determined that the billing process is to be performed for the execution of the entire write job in step S13. After steps S14 and S15, in response to the reception of the billing completion notification from the billing server 90 (step S16), the output process (specifically, the write process of the scan data of all the documents) regarding the entire write job is performed (step S17).

Meanwhile, for example, when the number of writable sheets N11 is 70 and the number of all the documents is 100, before the read process of all the documents is completed (specifically, at a point of time when 70 documents out of 100 documents are read), the number of read documents N20 reaches the number of writable sheets N11. In this case, the MFP 10 estimates that the insufficient capacity (accomplishment inhibition factor) of the write destination device is to occur in executing the write job, and determines that the write job is not accomplishable. The MFP 10 determines that there is the executable partial job based on the result of determining that the number of writable sheets N11 is equal to or greater than "1" in step S101. The process proceeds from step S84 to step S85.

In step S85, the MFP 10 decides that the billing process is to be performed for the execution of the executable partial job of the entire write job, and decides that the billing process is not to be performed for the execution of a remaining partial job of the entire write job except for the executable partial job. Specifically, it is decided that the billing process is to be performed for the execution of a job (executable partial job) for writing the scan data of 70 documents, of a job for writing the scan data of 100 documents in the write destination device, and it is decided that the billing process is not to be performed for the execution of a job (remaining partial job) for writing the scan data of the remaining documents (30 documents). The process proceeds from step S84 to step S85, and the MFP 10 stops the read process of the documents.

The process proceeds from step S85 to step S86 and subsequent steps.

Specifically, the MFP 10 calculates the amount of money to be billed for the execution of (only) the executable partial job of the entire write job (step S86), and displays the two-dimensional barcode including the billing information such as the amount of money to be billed on the touch panel 25 (step S87). Thereafter, the billing process is performed in the billing server 90 after the cooperation operation of the mobile terminal 50 with the billing server 90, and the billing completion notification is transmitted to the MFP 10 from the billing server 90.

When the billing completion notification is received from the billing server 90 (step S88), the MFP 10 performs the output process regarding the executable partial job (step S89). Specifically, the scan data (specifically, the scan data of 70 documents out of the 100 documents) of the read documents is written in the USB memory. In other words, the billing process is not performed for the execution of the write job (remaining partial job) regarding 30 documents (remaining documents) out of 100 documents which are not read yet, and the write process regarding the remaining partial job is not performed.

Figure 13:
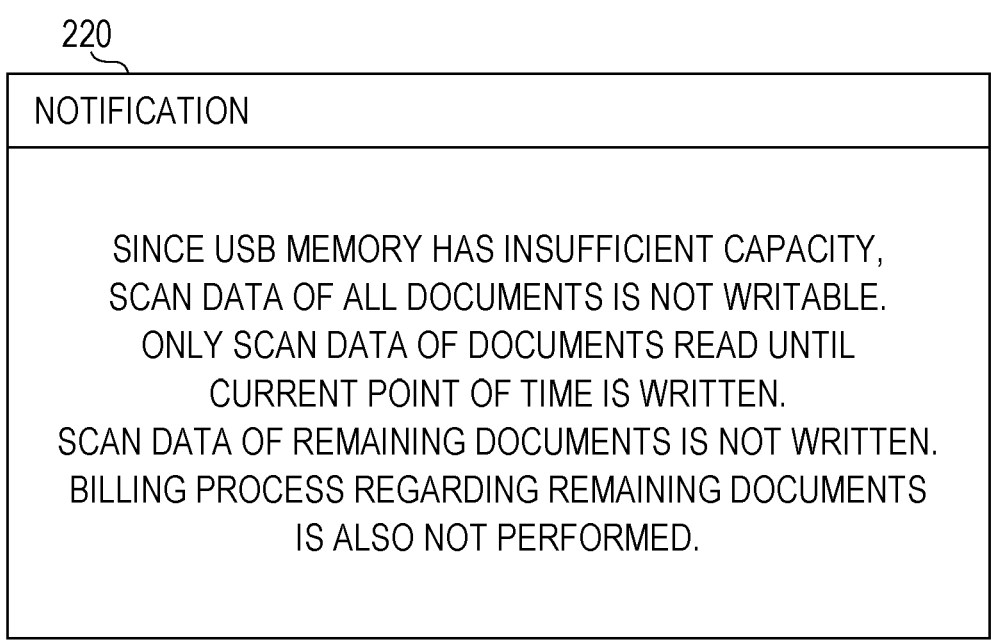
FIG. 13 is a diagram illustrating a notification screen according to the fourth embodiment.

In step S89, the MFP 10 notifies the user that the billing process is not performed for the execution of the remaining partial job. Specifically, the MFP 10 displays a notification screen 220 (see FIG. 13) on the touch panel 25. A notification indicating that the billing process is not performed for the execution of the remaining partial job is displayed on the notification screen 220.

As stated above, in the fourth embodiment, even though it is determined that the job is not accomplishable, when there is the executable partial job, it is decided that the billing process is to be performed for the execution of the executable partial job of the entire job (step S85). After the billing process is performed in the billing server 90, the output process regarding the executable partial job is performed in the MFP 10 (step S89). Accordingly, it is possible to flexibly perform execution control of the job while suppressing the occurrence of the refund process.

Modification Example of Fourth Embodiment

Although it has been described in the fourth embodiment that the execution command of the write job is received, the present invention is not limited thereto. An execution command of another kind of job may be received. For example, when an execution command of the print-out job is received, the following operation is performed.

When the execution command of the print-out job (for example, copy job) is received, the operation of FIG. 12 is also performed in the MFP 10 as in the fourth embodiment.

Specifically, in step S81, the number of sheets N10 capable of being output (specifically, the number of sheets capable of being printed out (the number of printable sheets) N12) is initially calculated based on the remaining amount A10 of consumables within the MFP 10 and the setting content in the print-out job. The read process of the documents is started (step S82).

Thereafter, when the read process of all the documents is completed before the number of read documents N20 reaches the number of printable sheets N12 (N10), it is estimated that the accomplishment inhibition factor (specifically, deficiency of consumables) is not to occur in executing the print-out job, and it is determined that the print-out job is accomplishable.

The process proceeds from step S83 to step S13 and subsequent steps. The operations of step S13 and subsequent steps are the same as those in the fourth embodiment (second embodiment). Specifically, it is decided that the billing process is to be performed for the execution of the entire print-out job (step S13). After steps S14 to S16, the print-out process regarding the entire print-out job is performed (step S17).

Meanwhile, when the number of read documents N20 reaches the number of printable sheets N12 before the read process of all the documents is completed, it is estimated that the accomplishment inhibition factor is to occur in executing the print-out job, and it is determined that the print-out job is not accomplishable.

The process proceeds from step S84 to step S85 and subsequent steps. The operations of step S85 and subsequent steps are the same as those in the fourth embodiment. Specifically, it is decided that the billing process is to be performed for the execution of the executable partial job of the entire print-out job, and it is decided that the billing process is not to be performed for the execution of the remaining partial job (step S85). After steps S86 to S88, the print-out process regarding only the executable partial job is performed (step S89).

5. Fifth Embodiment

A fifth embodiment is a variation example of the fourth embodiment. Hereinafter, differences from the fourth embodiment will be primarily described.

In the fourth embodiment, when it is determined that the job is not accomplishable and it is determined that there is the executable partial job, it is decided that the billing process is to be performed for the execution of the executable partial job, and it is decided that the billing process is not to be performed for the execution of the remaining partial job (step S85 (FIG. 12)).

In contrast, in the fifth embodiment, even though it is determined that the job is not accomplishable and it is determined that there is the executable partial job, when it is determined that the remaining partial job is accomplishable after the occurrence avoidance manipulation of the accomplishment inhibition factor, it is decided that the billing process is to be performed for the execution of the remaining partial job.

Figure 14:
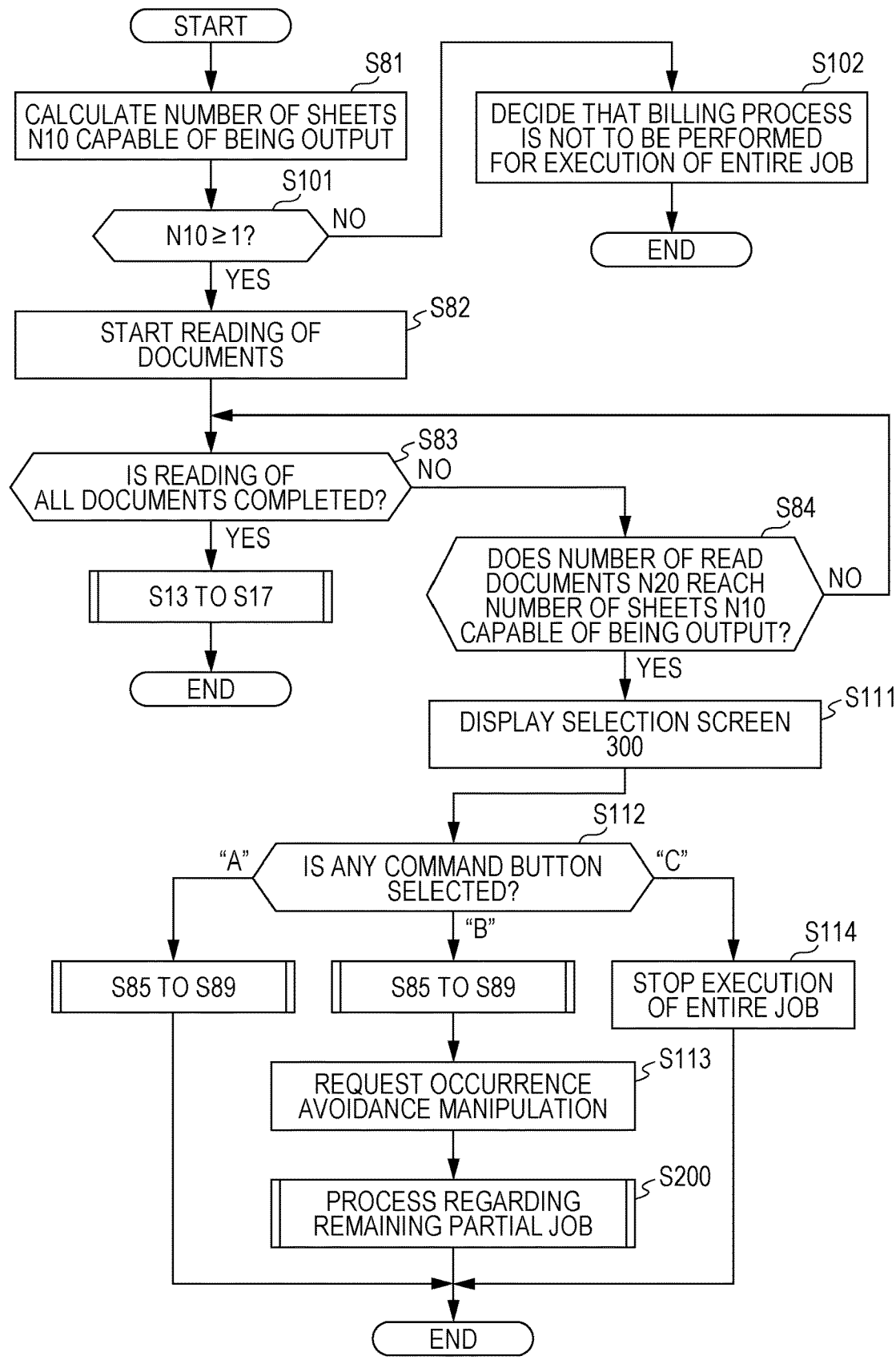
FIG. 14 is a flowchart illustrating an operation of the MFP according to a fifth embodiment.

FIG. 14 is a flowchart illustrating an operation of the MFP 10 according to the fifth embodiment.

In the fifth embodiment, after step S84 (after it is determined as "Yes" in step S84), the MFP 10 displays a selection screen 300 (FIG. 15) on the touch panel 25 (step S111). The MFP 10 performs the branch process according to a selection manipulation of the user on the selection screen 300 (step S112).

Figure 15:
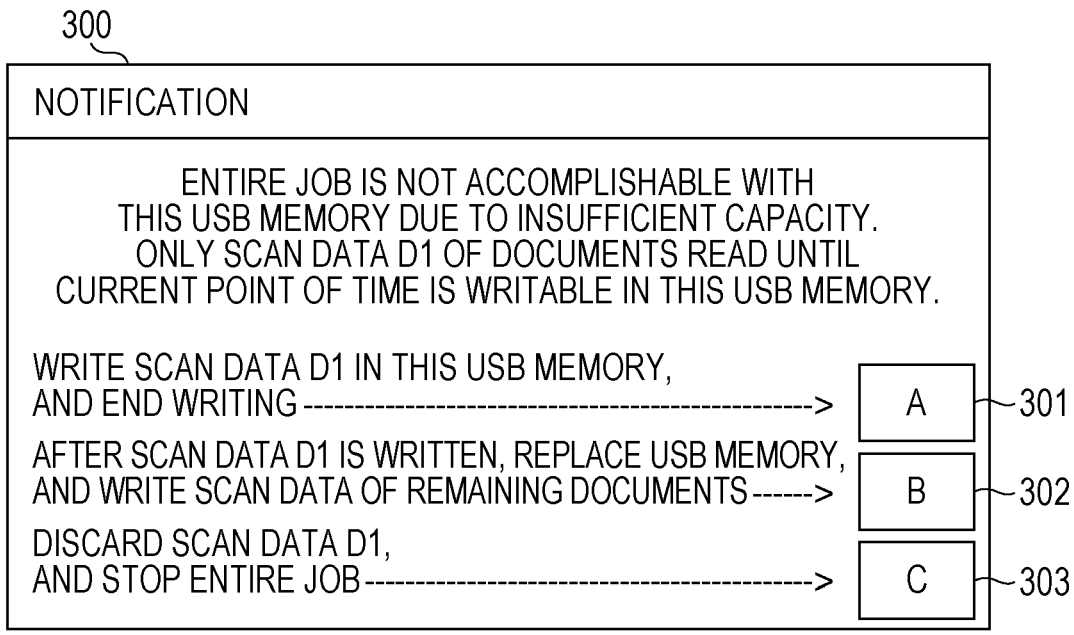
FIG. 15 is a diagram illustrating a selection screen.

FIG. 15 is a diagram illustrating the selection screen 300. As illustrated in FIG. 15, command buttons 301 to 303 are provided on the selection screen 300. The command button 301 is a button for commanding the execution of only the executable partial job of the entire write job. The command button 302 is a button for commanding the execution of not only the executable partial job but also the remaining partial job. The command button 303 is a button for commanding the stop of the execution of the entire write job. When the user wants to write scan data D1 of the documents (for example, 70 documents out of 100 documents) read until a current point of time (a point of time when the number of read documents N20 reaches the number of writable sheets N11) in the USB memory (the USB memory currently inserted into the MFP 10), and end the write job, the user presses the command button 301. When the user wants to replace the USB memory after the scan data D1 is written and write the scan data of the remaining documents (30 documents) in a new USB memory, the user presses the command button 302. When the user wants to discard the scan data D1 of 70 documents and stop of the entire write job, the user presses the command button 303.

For example, when the command button 301 is pressed on the selection screen 300, the process proceeds from step S112 to steps S85 to S89. The processing contents of steps S85 to S89 are the same as those in the fourth embodiment (see FIG. 12). Specifically, it is decided that the billing process is to be performed for the execution of the executable partial job of the entire write job, and it is decided that the billing process is not to be performed for the execution of the remaining partial job (step S85). After steps S86 to S88, the write process regarding only the executable partial job is performed (step S89).

When the command button 303 is pressed, the process proceeds from step S112 to step S114, and the MFP 10 stops the execution of the entire write job. Specifically, the MFP 10 decides that the billing process is not to be performed for the execution of the entire write job, and discards the scan data of the read documents (for example, 70 documents out of 100 documents). Accordingly, the billing process for the execution of the entire write job (the executable partial job and the remaining partial job) is not performed, and the write job is not performed.

When the command button 302 is pressed, the following operation is performed.

Specifically, the operations of steps S85 to S89 are initially performed as in the fourth embodiment. More specifically, it is decided that the billing process is to be performed for the execution of the executable partial job (for example, a job for writing the scan data of 70 documents) of the entire write job (for example, the job for writing the scan data of 100 documents in the write destination device) (step S85). Here, the decision of whether or not to perform the billing process for the execution of the remaining partial job (specifically, the job for writing the scan data of 30 documents) is postponed. The billing process is performed for the execution of only the executable partial job of the entire write job, and only the scan data of 70 documents is written in the USB memory (step S89).

Figure 16:
FIG. 16 is a diagram illustrating a request screen.

Thereafter (after the execution of the output process regarding the executable partial job (step S89)), the MFP 10 requests the user to conduct the occurrence avoidance manipulation (for example, the replacement manipulation of the USB memory) of the accomplishment inhibition factor (specifically, the insufficient capacity of the USB memory) (step S113). Specifically, the MFP 10 displays a request screen 350 (see FIG. 16) for requesting the occurrence avoidance manipulation of the accomplishment inhibition factor on the touch panel 25. FIG. 16 is a diagram illustrating the request screen 350.

Figure 17:
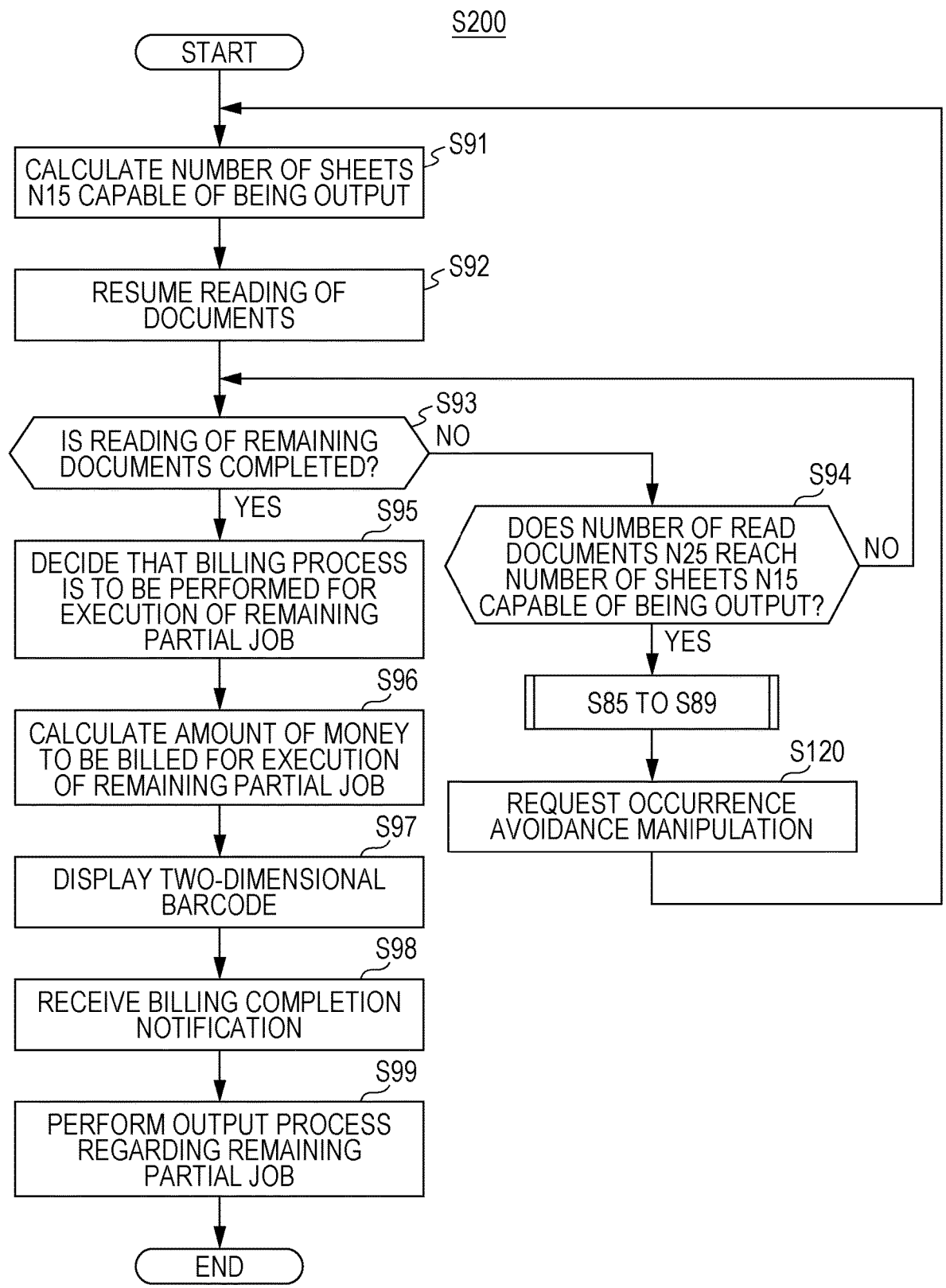
FIG. 17 is a flowchart illustrating an operation (an operation regarding a remaining partial job) of the MFP according to a fifth embodiment.

When the occurrence avoidance manipulation (the replacement manipulation of the USB memory) of the accomplishment inhibition factor conducted by the user is received (a new USB memory is inserted), the MFP 10 removes (does not display) the request screen 350, and starts a process (step S200) regarding the remaining partial job. FIG. 17 is a flowchart illustrating an operation (operation of the MFP 10) (step S200) including the accomplishment determination process regarding the remaining partial job.

Initially, the MFP 10 calculates the number of writable sheets (the number of newly writable sheets) N15 in the new USB memory based on the remaining capacity of the new USB memory (step S91), and resumes the read process of the documents (step S92). A count value of the read documents is reset prior to the resuming of the read process of the documents, and a count process of the number of newly read documents N25 is started.

The MFP 10 determines whether or not the remaining partial job is accomplishable based on whether or not the accomplishment inhibition factor is to occur in executing the remaining partial job (the job for writing the scan data of 30 documents out of 100 documents) (steps S93 and S94). Specifically, the processes of steps S93 and S94 are performed whenever the remaining documents (30 documents) are read one by one.

For example, when the read process of the remaining documents is completed before the number of newly read documents N25 reaches the number of newly writable sheets N15, it is estimated that there is no accomplishment inhibition factor (specifically, insufficient capacity) in executing the remaining partial job, and it is determined that the remaining partial job is accomplishable. In this case, the process proceeds from step S93 to step S95, and the MFP 10 decides that the billing process is to be performed for the execution of the remaining partial job.

After the calculation process (step S96) of the amount of money to be billed for the execution of the remaining partial job and the display process (step S97) of the two-dimensional barcode are performed, in response to the reception of the billing completion notification from the billing server 90 (step S98), the output process (write process) regarding the remaining partial job is performed (step S99). Specifically, the scan data of 30 documents (remaining documents) out of 100 documents is written in the new USB memory. Accordingly, the entire write job regarding 100 documents is accomplished.

Meanwhile, when the number of newly read documents N25 reaches the number of newly writable sheets N15 before the read process of the remaining documents is completed, it is estimated that there is the accomplishment inhibition factor (specifically, insufficient capacity) in executing the remaining partial job, and it is determined that the remaining partial job is not accomplishable. In this case, after the operations of steps S85 to S89 regarding a newly executable partial job of the remaining partial job are performed, the user is requested to conduct the occurrence avoidance manipulation by using the request screen 350 (FIG. 16) (step S120). The process returns to step S91, and the operation of FIG. 17 regarding a newly remaining partial job of the remaining partial job except for the newly executable partial job is performed (repeated) again.

As stated above, even though it is determined that the job is not accomplishable and it is determined that there is the executable partial job, when it is determined that the remaining partial job is accomplishable after the occurrence avoidance manipulation of the accomplishment inhibition factor, it is decided that the billing process is to be performed for the execution of the remaining partial job (step S95). After the billing process in the billing server 90, the output process (specifically, the write process of the scan data of the remaining documents) regarding the remaining partial job is performed in the MFP 10 (step S99). Accordingly, it is possible to suppress the occurrence of the refund process while increasing a possibility of the job accomplishment.

Although it has been described in the fifth embodiment that the execution command of the write job is received, the present invention is not limited thereto. For example, the execution command of the print-out job may be received.

6. Variation Example

Although the embodiments of the present invention have been described, the present invention is not limited to the contents described above.

For example, although it has been described in the embodiments that the mobile terminal 50 obtains the billing information (the amount of money to be billed and the billing target apparatus) by reading the two-dimensional barcode in the touch panel 25 of the MFP 10, the present invention is not limited thereto. The mobile terminal 50 may obtain the billing information by communicating with the MFP 10 (receiving the billing information from the MFP 10).

In the embodiments, the accomplishment determination process (step S11) may be performed under a condition in which the billing method in the MFP 10 is set as the pre-billing method.

Specifically, as the billing method regarding the execution of the job in the MFP 10, there are two kinds of billing methods of the pre-billing method and the post-billing method. The post-billing method is a billing method of billing for the execution of the job after the job is completed. The MFP 10 according to this modification example can selectively set the two kinds of billing methods as the setting content regarding the billing method, and an administrator of the MFP 10 sets the billing method of the billing process during the execution of the job to any one of the pre-billing method and the post-billing method. Thereafter, when the execution command of the job is received in the MFP 10, the MFP 10 determines whether or not the billing method in the MFP 10 is set to any one of the pre-billing method and the post-billing method. The MFP 10 performs the accomplishment determination process under a condition in which the billing method in the MFP 10 is set to the pre-billing method.

Accordingly, it is possible to appropriately use two kinds of billing methods.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
a determination part that performs an accomplishment determination process which is a process of determining whether or not a job is accomplishable prior to a billing process using a pre-billing method which is a billing method of billing for execution of the job before completion of the job; and
a decision part that decides whether or not to perform the billing process based on the determination result of the accomplishment determination process,
wherein the decision part decides that the billing process is to be performed for the execution of the job when it is determined that the job is accomplishable, and
decides that the billing process is not to be performed for the execution of the job when it is determined that the job is not accomplishable.

2. The image forming apparatus according to claim 1,
wherein the determination part determines whether or not the job is accomplishable based on an estimation result regarding whether or not an accomplishment inhibition factor which is a factor that inhibits the accomplishment of the job is to occur in executing the job.

3. The image forming apparatus according to claim 2,
wherein the job is a write job for writing processing target data in a write destination device,
the accomplishment inhibition factor includes at least one of insufficient capacity of the write destination device and failure of the write destination device, and
the determination part estimates whether or not the accomplishment inhibition factor is to occur based on whether or not a write trial process of writing dummy data corresponding to the processing target data in the write destination device on a trial basis is normally ended.

4. The image forming apparatus according to claim 2,
wherein the job is a write job for writing processing target data in a write destination device,
the accomplishment inhibition factor includes an insufficient capacity of the write destination device, and
the determination part estimates whether or not the accomplishment inhibition factor is to occur by comparing a capacity of the processing target data with a writable remaining capacity in the write destination device.

5. The image forming apparatus according to claim 2,
wherein the job is a print-out job,
the accomplishment inhibition factor includes a deficiency of consumables, and
the determination part estimates whether or not the accomplishment inhibition factor is to occur by comparing a remaining amount of consumables within the image forming apparatus with a usage amount of the consumables required for accomplishing the print-out job.

6. The image forming apparatus according to claim 2,
wherein the job is a facsimile transmission job,
the accomplishment inhibition factor includes a connection unable state which is a state in which connection for a transmission destination in the facsimile transmission job is not able to be established, and
the determination part estimates whether or not the accomplishment inhibition factor is to occur by attempting to establish line connection for the transmission destination.

7. The image forming apparatus according to claim 2,
wherein the decision part requests a user to conduct an occurrence avoidance manipulation which is a manipulation for avoiding the occurrence of the accomplishment inhibition factor when it is estimated that the accomplishment inhibition factor is to occur in executing the job,
the determination part performs the accomplishment determination process again when the occurrence avoidance manipulation is conducted by the user, and
the decision part decides that the billing process is to be performed for the execution of the job when it is determined that the job is accomplishable in the accomplishment determination process performed again after the occurrence avoidance manipulation even though it is determined that the job is not accomplishable.

8. An image forming apparatus comprising:
a determination part that performs an accomplishment determination process which is a process of determining whether or not a job is accomplishable prior to a billing process using a pre-billing method which is a billing method of billing for execution of the job before the job is completed; and
a decision part that decides whether or not to perform the billing process based on the determination result of the accomplishment determination process,
wherein, when it is determined that the job is accomplishable, the decision part decides that the billing process is to be performed for the execution of the entire job,
when it is determined that there is an executable partial job which is a partial job of the entire job which is capable of being executed even though it is determined that the job is not accomplishable,
it is decided that the billing process is to be performed for execution of the executable partial job of the entire job, and
it is decided that the billing process is not to be performed for execution of a remaining partial job of the entire job except for the executable partial job.

9. The image forming apparatus according to claim 8,
wherein the decision part decides that the billing process is not to be performed for the execution of the entire job when it is determined that the job is not accomplishable and it is determined that there is no executable partial job.

10. The image forming apparatus according to claim 8,
wherein the determination part determines whether or not the job is accomplishable based on an estimation result regarding whether or not an accomplishment inhibition factor which is a factor that inhibits the accomplishment of the job is to occur in executing the job.

11. The image forming apparatus according to claim 10,
wherein the job is a write job for writing scan data of documents read in a read process in a write destination device,
the accomplishment inhibition factor includes an insufficient capacity of the write destination device,
the image forming apparatus further includes a calculation part that calculates the number of writable sheets which is the number of sheets capable of being written in the write destination device based on a remaining capacity of the write destination device, and
the determination part estimates whether or not the accomplishment inhibition factor is to occur by comparing the number of read documents read in the read process with the number of writable sheets.

12. The image forming apparatus according to claim 10,
wherein the job is a print-out job for printing out scan data of documents read in a read process,
the accomplishment inhibition factor includes a deficiency of consumables,
the image forming apparatus further includes a calculation part that calculates the number of printable sheets which is the number of sheets capable of being printed out based on a remaining amount of consumables within the image forming apparatus, and
the determination part estimates whether or not the accomplishment inhibition factor is to occur by comparing the number of read documents read in the read process with the number of printable sheets.

13. The image forming apparatus according to claim 10,
wherein the decision part requests a user to conduct an occurrence avoidance manipulation which is a manipulation for avoiding the occurrence of the accomplishment inhibition factor when it is determined that the job is not accomplishable and it is determined that there is the executable partial job,
the determination part performs the accomplishment determination process regarding the remaining partial job when the occurrence avoidance manipulation is conducted by the user, and
the decision parts decides that the billing process is to be performed for execution of the remaining partial job when it is determined that the remaining partial job is accomplishable after the occurrence avoidance manipulation even though it is determined that the job is not accomplishable and it is determined that there is the executable partial job.

14. The image forming apparatus according to claim 1,
wherein the image forming apparatus is able to selectively set, as a setting content regarding a billing method, two kinds of billing methods of a post-billing method which is a billing method of billing for the execution of the job after the job is completed and the pre-billing method, and
the determination part performs the accomplishment determination process under a condition in which the billing method in the image forming apparatus is set to the pre-billing method.

15. A non-transitory recording medium storing a computer readable program causing a computer built in an image forming apparatus to perform:
performing an accomplishment determination process which is a process of determining whether or not a job is accomplishable prior to a billing process using a pre-billing method which is a billing method of billing for execution of the job before the job is completed; and
deciding whether or not to perform the billing process based on the determination result of the accomplishment determination process,
wherein, in the deciding,
when it is determined that the job is accomplishable in the performing of the accomplishment determination process, it is decided that the billing process is to be performed for the execution of the job, and
when it is determined that the job is not accomplishable in the performing of the accomplishment determination process, it is decided that the billing process is not to be performed for the execution of the job.

16. A non-transitory recording medium storing a computer readable program causing a computer built in an image forming apparatus to perform:
performing an accomplishment determination process which is a process of determining whether or not a job is accomplishable prior to a billing process using a pre-billing method which is a billing method of billing for execution of the job before the job is completed; and
deciding whether or not to perform the billing process based on the determination result of the accomplishment determination process,
wherein, in the deciding,
when it is determined that the job is accomplishable in the performing of the accomplishment determination process, it is decided that the billing process is to be performed for the execution of the job, and
when it is determined that there is an executable partial job of the entire job which is a partial job capable of being executed even though it is determined that the job is not accomplishable in the performing of the accomplishment determination process,
it is decided that the billing process is to be performed for execution of the executable partial job of the entire job, and
it is decided that the billing process is not to be performed for execution of a remaining partial job of the entire job except for the executable partial job.

17. The image forming apparatus according to claim 8,
wherein the image forming apparatus is able to selectively set, as a setting content regarding a billing method, two kinds of billing methods of a post-billing method which is a billing method of billing for the execution of the job after the job is completed and the pre-billing method, and
the determination part performs the accomplishment determination process under a condition in which the billing method in the image forming apparatus is set to the pre-billing method.

* * * * *